United States Patent
Kim

(10) Patent No.: US 12,500,880 B2
(45) Date of Patent: *Dec. 16, 2025

(54) SYSTEM FOR CONTROLLING NETWORK ACCESS AND METHOD THEREOF

(71) Applicant: PRIBIT Technology, Inc., Seoul (KR)

(72) Inventor: Young Rang Kim, Seoul (KR)

(73) Assignee: PRIBIT Technology, Inc., Seoul (KR)

(*) Notice: Subject to any disclaimer, the term of this patent is extended or adjusted under 35 U.S.C. 154(b) by 83 days.

This patent is subject to a terminal disclaimer.

(21) Appl. No.: 18/628,405

(22) Filed: Apr. 5, 2024

(65) Prior Publication Data

US 2024/0340274 A1    Oct. 10, 2024

(30) Foreign Application Priority Data

Apr. 7, 2023   (KR) .................. 10-2023-0046142

(51) Int. Cl.
*H04L 9/40* (2022.01)

(52) U.S. Cl.
CPC .................. *H04L 63/08* (2013.01)

(58) Field of Classification Search
CPC ......... H04L 63/08–029; H04L 12/4633; H04L 69/16

See application file for complete search history.

(56) References Cited

U.S. PATENT DOCUMENTS

| | | | | |
|---|---|---|---|---|
| 5,941,988 A | * | 8/1999 | Bhagwat | H04L 69/16 726/12 |
| 8,156,235 B2 | * | 4/2012 | Barreto | H04L 67/56 709/227 |
| 9,843,447 B1 | * | 12/2017 | Bishop | H04L 9/14 |
| 2005/0138369 A1 | * | 6/2005 | Lebovitz | H04L 63/065 713/163 |
| 2007/0083524 A1 | * | 4/2007 | Fung | H04L 12/66 |
| 2007/0153782 A1 | * | 7/2007 | Fletcher | H04L 61/5007 370/466 |
| 2010/0061253 A1 | * | 3/2010 | Kaminsky | H04L 41/12 370/248 |

(Continued)

FOREIGN PATENT DOCUMENTS

| | | |
|---|---|---|
| KR | 10-2396528 B1 | 5/2022 |
| KR | 10-2502367 B1 | 2/2023 |
| KR | 10-2514618 B1 | 3/2023 |

*Primary Examiner* — Taghi T Arani
(74) *Attorney, Agent, or Firm* — Seed Intellectual Property Law Group LLP

(57) ABSTRACT

Disclosed is a gateway which a communication circuit, a memory, and a processor operatively connected with the communication circuit and the memory. The processor receives a service request from a node, identifies whether the service request is received through at least any one of a tunnel authorized by an external server, a security session, or a logical connection, identifies whether there is data flow corresponding to the service request and authorized by the external server, generates authentication information to be inserted into the service request, based on authentication information included in the data flow, and inserts and forwards the authentication information to be inserted into the service request and information associated with the node into the service request to a service server.

17 Claims, 14 Drawing Sheets

(56) References Cited

U.S. PATENT DOCUMENTS

| | | | |
|---|---|---|---|
| 2010/0235877 A1* | 9/2010 | Hu | H04W 12/082 |
| | | | 726/13 |
| 2013/0083799 A1* | 4/2013 | Xie | H04L 69/326 |
| | | | 370/394 |
| 2014/0259094 A1* | 9/2014 | Narayanaswamy | H04L 63/20 |
| | | | 726/1 |
| 2017/0374025 A1* | 12/2017 | Pan | H04L 63/164 |
| 2018/0063077 A1* | 3/2018 | Tumuluru | H04L 43/103 |
| 2022/0247718 A1* | 8/2022 | Kim | H04L 63/029 |
| 2022/0247720 A1* | 8/2022 | Kim | H04L 12/4633 |

* cited by examiner

SYSTEM FOR CONTROLLING NETWORK ACCESS AND METHOD THEREOF

CROSS-REFERENCE TO RELATED APPLICATION

This application claims the benefit of priority to Korean Patent Application No. 10-2023-0046142, filed in the Korean Intellectual Property Office on Apr. 7, 2023, the entire contents of which are incorporated herein by reference.

BACKGROUND

Technical Field

The present disclosure relates to a system for controlling network access and a method thereof.

Description of the Related Art

A plurality of devices may communicate data over a network. For example, a terminal may transmit or receive data with a server over the Internet. The network may include a private network such as an intranet as well as a public network such as the Internet.

Because a node connected with a gateway based on accessibility control such as a logical connection, a tunnel, or a security session connects a network only when authorized through a procedure such as various authentication, whether the node is granted, or safety verification and a node which is unauthorized through various inspections is assigned access, an unspecified target of a network boundary technology using an existing IP-based filtering technology is able to be always connected with the node.

BRIEF SUMMARY

The present disclosure has been made to solve the above-mentioned problems occurring in the prior art while advantages achieved by the prior art are maintained intact.

A node may form a mutual trust relationship between a gateway and a controller and may access a service connected with the gateway through the assigned access. However, because a service server (e.g., a web server, a web application server, or the like) which is present in layer 7 (an application layer) is able to still identify only a source IP address of layer 3 (a network layer), there may occur a problem in which it is unable to identify detailed information about whether there is an authorized target and which target is connected.

To address the above-problem, the service server uses a method for performing a separate authentication procedure (e.g., authentication based on user ID and password input, multi factor authentication, OAuth authentication, or the like) to identify the user and generating and inserting unique identification information into a protocol of layer 7 to subsequently maintain mutual authentication between the node and the service based on the identification information inserted upon a service request and identify a target.

However, the authentication scheme based on identification information insertion between the node and the service exposes identification information in a communication interval between two communication targets. Particularly, when a node in which there is a blind spot incapable of being controlled by an IP network stack (OSI 7 layers) is infected with malware or a stealer with intent steals identification information received from the service and inserts the stolen identification information into another node to request the service, there are vulnerabilities in which the stealer is assigned authentication of the stolen node and related privilege to use the service.

To address the above vulnerabilities, the service uses any token scheme rather than fixed identification information. However, as a steal and attack method also become more sophisticated, identification information using any token also have the same vulnerabilities.

An aspect of the present disclosure provides a system for addressing the above-mentioned problem in a network environment and a method thereof.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, a gateway may include a communication circuit, a memory, and a processor operatively connected with the communication circuit and the memory. The processor may be configured to receive a service request from a node, identify whether the service request is received through at least any one of a tunnel authorized by an external server, a security session, or a logical connection, identify whether there is data flow corresponding to the service request and authorized by the external server, generate authentication information to be inserted into the service request, based on authentication information included in the data flow, and insert and forward the authentication information to be inserted into the service request and information associated with the node into the service request to a service server.

According to another aspect of the present disclosure, a server may include a communication circuit, a memory storing a database, and a processor operatively connected with the communication circuit and the memory. The processor may be configured to receive an authentication request including data flow identification information from a gateway, identify whether to request additional authentication from an authentication server based on the database, request authentication from the authentication server and receive an authenticated result and authentication-related information, when there is a need to request the additional authentication, update data flow corresponding to the data flow identification information based on the authentication-related information, and transmit the updated data flow to the gateway.

According to another aspect of the present disclosure, an operation method of a gateway may include receiving a service request from a node, identifying whether the service request is received through at least any one of a tunnel authorized by an external server, a security session, or a logical connection, identifying whether there is data flow corresponding to the service request and authorized by the external server, generating authentication information to be inserted into the service request, based on authentication information included in the data flow, and inserting and forwarding the authentication information to be inserted into the service request and information associated with the node into the service request to a service server.

BRIEF DESCRIPTION OF THE SEVERAL VIEWS OF THE DRAWINGS

The above and other objects, features and advantages of the present disclosure will be more apparent from the following detailed description taken in conjunction with the accompanying drawings.

DETAILED DESCRIPTION

Figure 1:
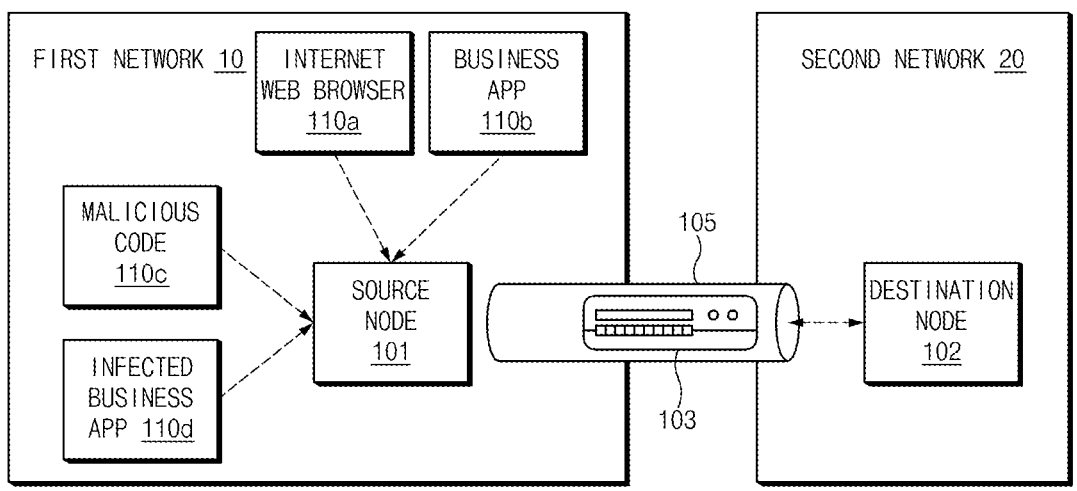
FIG. 1 illustrates an environment including a plurality of networks.

Hereinafter, various embodiments of the present disclosure will be described with reference to the accompanying drawings. However, it should be understood that this is not intended to limit the present disclosure to specific implementation forms and includes various modifications, equivalents, and/or alternatives of embodiments of the present disclosure.

A singular form of a noun corresponding to an item in the present disclosure may include one or plural of the items, unless the relevant context clearly indicates otherwise. In the present disclosure, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. Such terms as "1st" and "2nd," or "first" and "second" may be used to simply distinguish a corresponding component from another, and does not limit the components in other aspect (e.g., importance or order). It is to be understood that if any (e.g., a first) component is referred to, with or without the term "operatively" or "communicatively," as "coupled with," "coupled to," "connected with," or "connected to" another (e.g., a second) component, it means that the element may be coupled with the other element directly (e.g., wiredly), wirelessly, or via a third component.

Each (e.g., a module or a program) of components described in the present disclosure may include singular or plural entities. According to various embodiments, one or more of the above-described components or operations may be omitted, or one or more other components or operations may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

As used in the present disclosure, the term "module" may include a unit implemented in hardware, software, or firmware, and may interchangeably be used with other terms, for example, "logic," "logic block," "part," or "circuit." A module may be an integral part, or a minimum unit or portion thereof, adapted to perform one or more functions. For example, according to an embodiment, the module may be implemented in the form of an application-specific integrated circuit (ASIC).

Various embodiments of the present disclosure may be implemented as software (e.g., a program) including instructions that are stored in a machine-readable storage medium (e.g., an internal memory or an external memory). For example, a processor of the machine may invoke at least one of the stored one or more instructions from the storage medium, and execute it. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Here, the term "non-transitory" simply means that the storage medium is a tangible device and does not include a signal (e.g., an electromagnetic wave), but this term does not differentiate between where data is semipermanently stored in the storage medium and where data is temporarily stored in the storage medium.

A method according to various embodiments disclosed in the present disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least a part of the computer program product may be temporarily generated or at least temporarily stored in the machine-readable storage medium, such as a memory of the manufacturer's server, a server of the application store, or a relay server.

FIG. 1 illustrates an environment including a plurality of networks.

Referring to FIG. 1, a first network 10 and a second network 20 may be different networks. For example, the first network 10 may be a public network, such as the Internet, and the second network 20 may be a private network, such as an intranet or a virtual private network (VPN).

The first network 10 may include a source node 101. In FIG. 1 and embodiments described below, the "source node" may be various types of devices capable of performing data communication. For example, the source node 101 may include a portable device, such as a smartphone and a tablet, a computer device, such as a desktop or a laptop, a multimedia device, a medical device, a camera, a wearable device, a virtual reality (VR) device, or a home appliance, but not limited to the above-mentioned devices. For example, the source node 101 may include a server or a communication device capable of transmitting a data packet through an application. The source node 101 may be referred to as an "electronic device" or a "terminal." Meanwhile, a destination node 102 may include a device which is the same as or similar to the above-mentioned source node 101. For another example, the destination node 102 may be substantially the same as a destination network.

The source node 101 may attempt to access a second network 20 and may transmit data to the destination node 102 included in the second network 20. The source node 101 may transmit data to the destination node 102 through a communication device 103. According to an embodiment, the communication device 103 may be a component included in the source node 101.

When access of the source node 101 to the first network 10 is granted, because the source node 101 is able to communicate with all servers included in the first network 10, it may be exposed from an attack of a malicious program. For example, the source node 101 may receive a malicious code 110c or data of an untrusted or insecure application, such as an infected business application (app) 110d, as well as an Internet web browser 110a or a trusted and/or secure application, such as a business app 110b.

The source node 101 infected from the malicious program may attempt to access the second network 20 and/or transmit data to the second network 20. When the second network 20 is established based on an IP like a VPN, it may be difficult for the second network 20 to separately monitor a plurality of devices included in the second network 20 and the second network 20 may be vulnerable to security for an application layer or a transport layer in an OSI layer. Furthermore, when the source node 101 includes a malicious application after the channel is already generated, data of the malicious application may be delivered to another electronic device (e.g., the destination node 102) in the second network 20.

Figure 2:
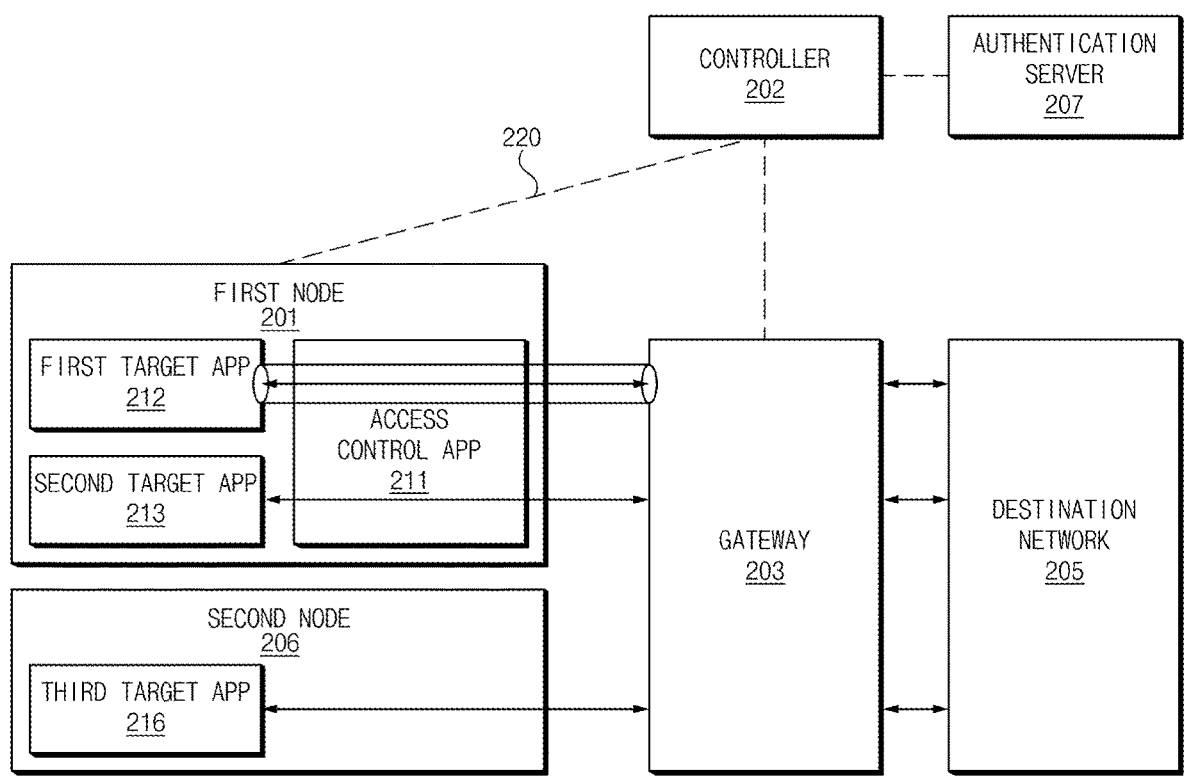
FIG. 2 illustrates an architecture in a network environment according to various embodiments.

FIG. 2 illustrates an architecture in a network environment according to various embodiments.

Referring to FIG. 2, a node may include a first node 201 and a second node 206. For example, the first node 201 may be a node in which an access control app 211 is installed and the second node 206 may be a node in which an access control app is not installed. Hereinafter, the first node 201 will be described as the node 201.

The node 201 may be various types of devices capable of performing data communication. For another example, the node 201 may include a portable device, such as a smartphone and a tablet, a computer device, such as a desktop or a laptop, a multimedia device, a medical device, a camera, a wearable device, a virtual reality (VR) device, or a home appliance, but not limited to the above-mentioned devices. For example, the node 201 may include a server or a gateway capable of transmitting a data packet through an application. The node 201 may be referred to as an "electronic device" or a "terminal."

The node 201 may store a first target app 212, a second target app 213, and the access control app 211. The first target app 212 may be controlled by the access control app 211 and may transmit a data packet to a destination network 205 or, conversely, may receive a data packet. Because one of the first target app 212 or the second target app 213 is able to be a web browser or a trusted and/or secure application such as a business app, whereas the other of the first target app 212 or the second target app 213 is able to be an untrusted or insecure malicious program, a network access system according to embodiments may block access to the destination network 205 of an unauthorized program (or application) and may isolate the program, by means of network access control of the access control app 211. For example, because the first target app 212 according to embodiments communicates with the destination network 205, the access control app 211 may identify whether it is accessible from the controller 202. When it is accessible, the access control app 211 may control data packet transmission of the first target app 212 and the second target app 213. In other words, the first target app 212 and the second target app 213 should pass through the access control app 211 to access a network and the access control app 211 should be authorized from the controller 202. The access control app 211 may transmit data packets of the first target app 212 and the second target app 213 based on data flow based on a policy of the controller 202. According to an embodiment, network access of the first target app 212 may be controlled as a channel or session is generated between the first target app 212 and the gateway 203 and network access of the second target app 213 may be controlled through a logical connection.

According to an embodiment, the second node 206 may be a node in which an access control app is not installed and network access of the second node 206 may be controlled through the gateway 203.

The controller 202 may be, for example, a server (or a cloud server). The controller 202 may manage data transmission between the node 201, the gateway 203, and the destination network 205 to ensure trusted data transmission in the network environment. For example, the controller 202 may grant network access of the node 201 (or the access control app 211) authorized by means of policy information or blacklist information. The controller 202 may provide information to generate a channel between the node 201 and the gateway 203. Thus, the access control app 211 of the node 201 may prevent an unauthorized application from transmitting a data packet for an unauthorized purpose and may provide a structure in which only an authorized data packet is able to be transmitted to the destination network 205 through the gateway 203 and the generated channel.

According to an embodiment, the controller 202 may communicate with an authentication server 207 to perform additional authentication. For example, when an authentication request is received, the controller 202 may identify whether to perform additional authentication from the authentication server 207 and may request authentication from the authentication server 207 to receive authentication-related information, when performing the additional authentication. According to an embodiment, the authentication server 207 may include at least any one of authentication-related technologies such as OAuth, SAML, LDAP, and Active Directory.

According to an embodiment, network access of the first target app 212 and the second target app 213 may be blocked from the access control app 211, the controller 202, or the gateway 203. According to an embodiment, the controller 202 may transmit and receive a control data packet with the access control app 211 to perform various operations (e.g., registration, grant, authentication, update, and end) associated with network access of the node 201 or the access control app 211. Flow (e.g., 220) in which the control data packet is transmitted may be referred to as "control flow." According to an embodiment, the controller 202 may immediately collect a channel depending on a security event received from an interworking system (e.g., the node 201, the gateway 203, or the destination network 205), thus always maintaining a secure network state.

The gateway 203 may be located at the boundary of a network to which the node 201 belongs or the boundary of a network to which the destination network 205 belongs. According to an embodiment, the gateway 203 may be connected with the controller 202 based on a cloud. According to an embodiment, flow in which the data packet is transmitted between the access control app 211 and the gateway 203 may be referred to as "data flow." The data flow may be generated in more detailed units (e.g., for each application) as well as for each node or IP.

According to various embodiments, an accessibility control technology in which an authorized target is able to be connected with the gateway, for example, a logical connection, a channel, or a session, may block an unauthorized target from accessing a network in which there is a service (e.g., a cloud, a business network, the Internet needing control, or the like as a protection target network), may control only the authorized target o access the service, and may identify the authorized target, thus improving a problem of existing Internet protocol (IP) communication with which an unspecified target is always connected and a problem of identifying a communication target based on an IP address.

For a service protocol (e.g., the HTTP, the FTP, or the like) based on the existing IP communication, the service may identify an authorized target, may perform additional authentication, or may additionally identify important information of the communication target and may record the information in a header of service request or return information (e.g., a session, a cookie, or the like for the HTTP) or a body (e.g., information for maintaining a POST parameter, parameter information included in a URL, or the like), such that the information is always exposed to the node or a communication interval between the node and the service.

Thus, in a network access control technology according to embodiments disclosed in the present disclosure, because an interval between the node 201 and the gateway 203 from the starting point of the gateway 203 which is present as the boundary between the node 201 and the destination network 205 to which the accessibility control technology is applied is an untrusted or insecure interval (e.g., an interval in which an attack such as Credential Stuffing, Session Hijacking, or Man In The Middle Attack is bound to occur), it may be set to an interval in which node identification information and important information are not present or are minimized. An interval between the gateway 203 and the destination network 205 may be logically divided into a trusted interval (e.g., an interval in which various vulnerabilities capable of being generated in an untrusted or insecure interval due to the intervention of a third party are not present or are minimized).

In other words, the gateway 203 may provide a structure for processing a service request and request return in the state in which attack and vulnerable information capable of being generated in an interval between the node 201 and the gateway 203 is not present or is minimized and may allow identification information of the node 201 and important information to be present in only the interval between the gateway 203 and the destination network 205, thus resolving vulnerabilities inherent in the service protocol based on existing IP communication and processing the service included in the destination network to communicate with an authorized target which is always secure and trusted.

According to various embodiments, the node 201 may include the access control app 211 for managing network access of the target apps 212 and 213 stored in the node 201 and a network driver (not shown). For example, when an access event of the target apps 212 and 213 included in the node 201 to the destination network 205 occurs, the access control app 211 may determine whether the target apps 212 and 213 are able to access the destination network 205. When the target apps 212 and 213 are able to access the destination network 205, the access control app 211 may transmit a data packet to the gateway 203. The access control app 211 may control transmission of the data packet by means of a kernel including an operating system in the node 201 and the network driver.

Figure 3:
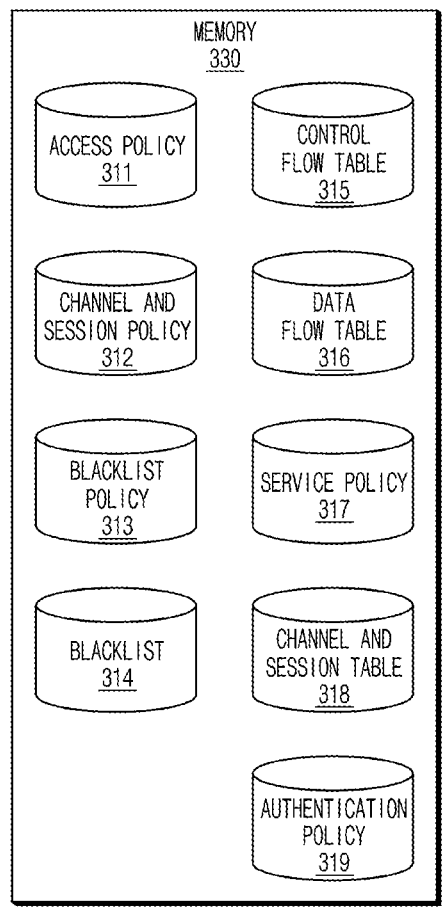
FIG. 3 is a functional block diagram illustrating a database stored in a controller according to various embodiments.

FIG. 3 is a functional block diagram illustrating a database stored in a controller according to various embodiments. FIG. 3 illustrates only a memory 330, but a controller 202 may further include a communication circuit (e.g., a communication circuit 430 of FIG. 4) for performing communication with an external electronic device and a processor (e.g., a processor 410 of FIG. 4) for controlling the overall operation of the controller 202.

An administrator may access the controller 202 and may set a connection-oriented policy for controlling access between an access control app 211 and a destination network 205, thus controlling more precise and secure network access than managing a session at a service stage.

An access policy database 311 may include information about an identified network, a network accessible to a node or an application, and/or a service. For example, when the access control app 211 requests network access, the controller 202 may determine whether a network identified based on a policy of the access control database 311 (e.g., a network to which the node 201 belongs), a node, a user (e.g., a user of the node 201), and/or an application (e.g., the target app 212 included in the node 201) are/is able to access the destination network 205. According to an embodiment, the controller 202 may generate a whitelist of the target app 212 which is able to access a specific service (e.g., an IP and a port) based on the access policy database 311.

A channel and session policy database 312 may include information of a gateway (e.g., a gateway 203 of FIG. 2) which is present between the node 201 and a service server (e.g., the destination network 205 of FIG. 2) on a connection path depending on a policy. According to an embodiment, the channel and session policy database 312 may include at least any one of a series of pieces of information for generating a channel between the node 201 and the gateway 203 (e.g., authentication information and a series of pieces of information for tunneling generation), a series of pieces of information for authenticating a logical connection between the node 201 and the gateway 203 (e.g., a method and a series of pieces of information for generating and inspecting authentication information depending on a protocol), a series of pieces of information for generating a session between the node 201 and the gateway 203 (e.g., a certificate and a series of pieces of information for generating a security session), or a scheme for removing a session when a generated session is not an authorized session when the internal session is generated between the node 201 and the gateway 203. In other words, the channel and session policy database 312 may include a series of pieces of information and a policy for identifying whether the node 201 or a communication target is authorized and are necessary for accessibility control.

A blacklist policy database 313 may indicate a blacklist registration policy for blocking access of a target (e.g., at least one of a node identifier (ID), an IP address, a media access control (MAC) address, or a user ID) identified by means of a risk level of a security event among security events collected on a periodic basis from the node 201 or the gateway 203, a cycle of occurrence, and/or a behavior analysis. Furthermore, the blacklist policy database 313 may be used as information for determining a risk level of an application depending on the result of inspecting the application and determining whether the application is temporarily or permanently isolated according to the risk level.

A blacklist database 314 may include a list of targets blocked by the blacklist policy database 313. For example, when identification information of the node 201 which requests network access is included in the blacklist database 314, the controller 202 may deny the network access request to isolate the node 201.

A control flow table 315 is an example of a session table for managing flow (e.g., control flow) of a control data packet generated between the node 201 and the controller 202. When the node 201 successfully accesses the controller 202, control flow information may be generated by the controller 202. The control flow information may include at least one of identification information of control flow, an IP address identified when accessing and authenticating the controller 202, a node ID, or a user ID. For example, access to a destination network 205 is requested from the node 201, the controller 202 may search for control flow information by means of the control flow identification information received from the node 201 and may map at least one of the IP address, the node ID, or the user ID included in the found control flow information to the access policy database 311, thus determining whether the node 201 is able to access destination network 205 and whether data flow for transmitting a data packet is generated.

According to an embodiment, the control flow may have an expiration time. The node 201 should update the expiration time of control flow. When the expiration time is not updated during a certain time, the control flow (or control flow information) may be removed. Furthermore, when it is determined to need to immediately block access depending on a security event collected from the node 201, the controller 202 may remove the control flow depending on an access end request of the node 201. When the control flow is removed, because the previously generated data flow is also removed, access of the node 201 may be blocked.

A data flow table 316 may be a table for managing flow (e.g., data flow) in which a detailed data packet is transmitted between the node 201, the gateway 203, and the destination network 205. The data flow may be generated for each TCP session, for each application, or in more detailed units. The data flow table 316 may manage dependent data flow using a data flow ID for identifying data flow and a control flow ID assigned to a transmission entity.

According to an embodiment, the data flow table 316 may include one or more pieces of identification information and each processing information (e.g., logical connection authentication information or session generation or identification information) corresponding to an accessibility control type to be processed to be connected with one or more gateways 203 by an application, accessibility control information for identifying that the gateway 203 is the authorized node 201 (e.g., whether there is access based on logical connection authentication, whether there is access based on an authorized channel or session, information for identifying it, or state information), channel and session information and authorized target information for determining whether to forward a data packet based on the data packet of a target authorized based on it and a destination IP, a service port, and service domain information of a service request, or state information including whether the data flow is valid.

According to an embodiment, the data flow table 316 may include authentication information. For example, the data flow table 316 may include information associated with whether the node 201 should perform additional authentication to access a service or additional information of an authorized target, which will be inserted through the gateway 203, as information preset by a service provider (e.g., information incapable of being identified through a general service protocol, for example, an operating system of the node, a device type of the node, user identification information of the node, security compliance information, or a series of pieces of information received from an authentication server). For example, the additional information of the authorized target may include a series of pieces of information for identifying whether there is the authorized target, which is previously identified by the controller depending on it, or information for determining whether to insert the series of pieces of information previously identified by the controller into a header or a body as a method for inserting the series of pieces of information previously identified by the controller. For example, the additional information of the authorized target may be generated based on a service policy database 317 and the information associated with whether to perform the additional authentication to access the service may be generated based on an authentication policy database 319.

The data flow table 316 may be managed based on a control flow ID.

According to an embodiment, the data flow table 316 may be stored in the node 201 and the gateway 203 in the same manner.

The service policy database 317 may include a destination IP and port information accessible to an access target through a proxy depending on the access policy database 311, service domain information, protocol information (e.g., the HTTP, the FTP, or an IoT-specific protocol), and additional information of the authorized target, which will be inserted through the gateway 203, as information preset by a service provider. According to an embodiment, the additional information of the authorized target may include information incapable of being identified through a general service protocol, for example, an operating system of the node, a device type of the node, user identification information of the node, security compliance information, or a series of pieces of information received from the authentication server. For example, the additional information of the authorized target may include a series of pieces of information for identifying whether there is the authorized target, which is previously identified by the controller depending on it, or information for determining whether to insert the series of pieces of information previously identified by the controller into a header or a body as a method for inserting the series of pieces of information previously identified by the controller.

A channel and session table 318 may be a table for managing a channel or session between the node 201, an access control app 211, or target apps 212 and 213 and the gateway 203. For example, when the channel or session is generated between the node 201, the access control app 211, or the target apps 212 and 213 and the gateway 203, information associated with the generated channel or session may be updated in the channel and session table 318. For another example, when the channel or session is removed between the node 201, the access control app 211, or the target apps 212 and 213 and the gateway 203, information associated with the removed channel or session may be updated in the channel and session table 318.

An authentication policy database 319 may include information for identifying a node, identifying a user, or identifying whether a target identified at a service access time point should perform additional authentication in an authentication server (e.g., an authentication-related technology, such as OAuth, SAML, LDAP, or Active Directory, or the like) except for the controller 202, depending on the access policy database 311. According to an embodiment, the authentication policy database 319 may include a series of pieces of information, such as an authentication server and an authentication scheme, when the additional authentication should be performed.

Figure 4:
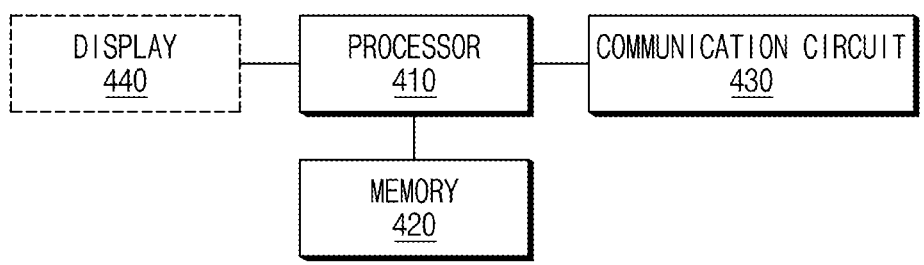
FIG. 4 illustrates a functional block diagram of a node according to various embodiments.

FIG. 4 illustrates a functional block diagram of a node according to various embodiments.

Referring to FIG. 4, the node may include a processor 410, a memory 420, and a communication circuit 430. According to an embodiment, the node may further include a display 440 for performing an interface with a user.

The processor 410 may control the overall operation of the node. In various embodiments, the processor 410 may include one processor single core or may include a plurality of processor cores. For example, the processor 410 may include a multi-core such as a dual-core, a quad-core, or a hexa-core. According to embodiments, the processor 410 may further include a cache memory located internally or externally. According to embodiments, the processor 410 may be configured with one or more processors. For example, the processor 410 may include at least one of an application processor, a communication processor, or a graphical processing unit (GPU).

All or a portion of the processor 410 may be electrically or operatively coupled with or connected to another component (e.g., the memory 420, the communication circuit 430, or the display 440) in the node. The processor 410 may receive commands of other components of the node, may interpret the received commands, and may perform calculation or may process data, depending on the interpreted commands. The processor 410 may interpret and process a message, data, an instruction, or a signal received from the memory 420, the communication circuit 430, or the display 440. The processor 410 may generate a new message, data, instruction, or signal based on the received message, data, instruction, or signal. The processor 410 may provide the memory 420, the communication circuit 430, or the display 400 with the processed or generated message, data, instruction, or signal.

The processor 410 may process data or a signal which is generated or occurs by a program. For example, the processor 410 may request an instruction, data, or a signal from the memory 420 to run or control the program. The processor 410 may record (or store) or update an instruction, data, or a signal in the memory 420 to run or control the program.

The memory 420 may store an instruction to control the node, a control instruction code, control data, or user data. For example, the memory 420 may include at least one of an application program, an operating system (OS), middleware, or a device driver.

The memory 420 may include one or more of a volatile memory or a non-volatile memory. The volatile memory may include a dynamic random access memory (DRAM), a static RAM (SRAM), a synchronous DRAM (SDRAM), a phase-change RAM (PRAM), a magnetic RAM (MRAM), a resistive RAM (RRAM), a ferroelectric RAM (FeRAM), or the like. The non-volatile memory may include a read only memory (ROM), a programmable ROM (PROM), an electrically programmable ROM (EPROM), an electrically erasable programmable ROM (EEPROM), a flash memory, or the like.

The memory 420 may further include a non-volatile medium such as a hard disk drive (HDD), a solid state disk (SSD), an embedded multi media card (eMMC), or universal flash storage (UFS).

According to an embodiment, the memory 420 may store target apps 212 and 213 and an access control app 211 of FIG. 2. The access control app 211 may perform a function of generating and updating control flow with a controller 202. To this end, the access control app 211 may include one or more security modules.

According to an embodiment, the memory 420 may store some of pieces of information included in a memory (e.g., a memory 330 of FIG. 3) of the controller. For example, the memory 420 may store a data flow table 316 described in FIG. 3.

The communication circuit 430 may assist in establishing a wired or wireless communication connection between the node and an external electronic device (e.g., the controller 202, a gateway 203, or service servers 205 and 206 of FIG. 2) and performing communication through the established connection. According to an embodiment, the communication circuit 430 may include a wireless communication circuit (e.g., a cellular communication circuit, a short range wireless communication circuit, or a global navigation satellite system (GNSS) communication circuit) or a wired communication circuit (e.g., a local area network (LAN) communication circuit or power line communication circuit) and may communicate with the external electronic device over a short range communication network, such as Bluetooth, WiFi direct, or infrared data association (IrDA), or a long range communication network, such as a cellular network, the Internet, or a computer network using the corresponding communication circuit among them. The above-mentioned several types of communication circuits 430 may be implemented as one chip or may be respectively implemented as separate chips.

The display 440 may output content, data, or a signal. In various embodiments, the display 440 may display image data processed by the processor 410. According to embodiments, the display 440 may be coupled with a plurality of touch sensors (not shown) capable of receiving a touch input or the like to be configured with an integrated touch screen. When the display 440 is configured with the touch screen, the plurality of touch sensors may be arranged over the display 440 or under the display 440.

A server (e.g., the controller) according to an embodiment may include the processor 410, the memory 420, and the communication circuit 430. The processor 410, the memory 420, and the communication circuit 430 included in the server may be substantially the same as the processor 410, the memory 420, and the communication circuit 430, which are described above.

A gateway (e.g., the gateway 203 of FIG. 2) according to an embodiment may include the processor 410, the memory 420, and the communication circuit 430. The processor 410, the memory 420, and the communication circuit 430 included in the gateway may be substantially the same as the processor 410, the memory 420, and the communication circuit 430, which are described above.

Figure 5:
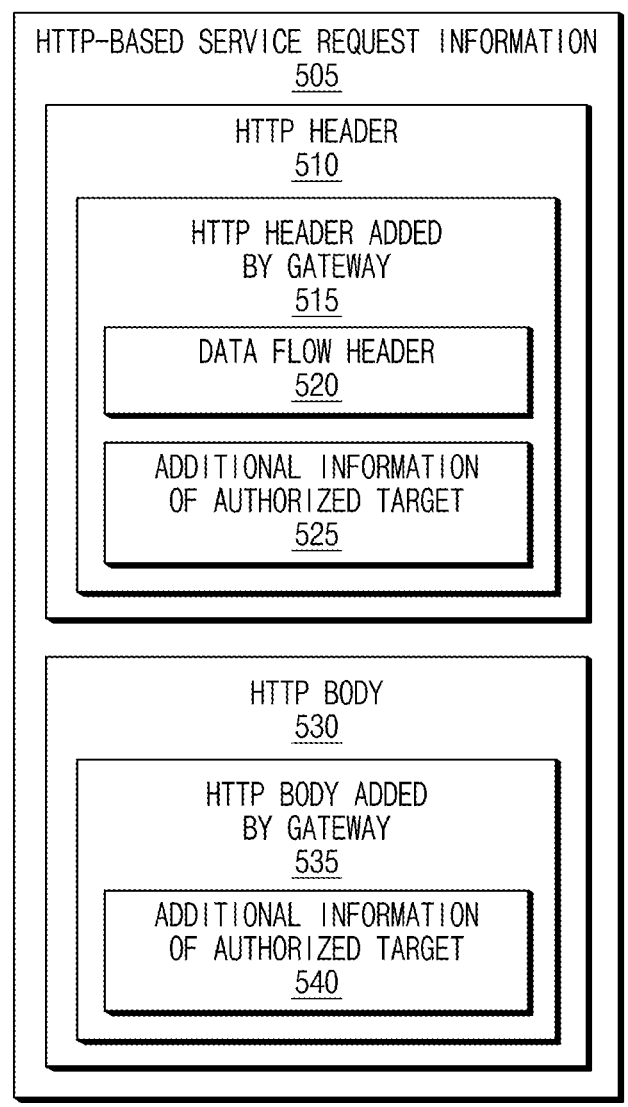
FIG. 5 illustrates an example of an additional information insertion structure of a target authorized when forwarding service request information according to various embodiments.

FIG. 5 illustrates an example of an additional information insertion structure of a target authorized when forwarding service request information according to various embodiments.

Referring to FIG. 5, an HTTP-based service request information 505 may include an HTTP header 510 and an HTTP body 530.

According to an embodiment, the HTTP header 510 may include an HTTP header 515 added by a gateway 203. The HTTP header 515 added by the gateway 203 may include a data flow header 520 and additional information 525 of an authorized target. In other words, the gateway 203 may add the data flow header 520 and the additional information 525 of the authorized target to the HTTP header 510 such that a service server which is present in the destination network 205 is able to identify whether there is a request of the authorized target through the HTTP header 510.

According to an embodiment, the HTTP body 530 may include an HTTP body 535 added by the gateway 203. The HTTP body 535 added by the gateway 203 may include additional information 540 of the authorized target. In other words, the gateway 203 may insert or add the additional information 540 of the authorized target to the HTTP body 530.

According to an embodiment, when receiving a service request based on an authorized accessibility control element, a proxy included in the gateway 203 may identify an access target and a service requested by the access target by means of a data flow table 316 and may include additional information of the authorized target, which is included in data flow, (e.g., information incapable of being identified through a general service protocol, for example, an operating system of the node, a device type of the node, user identification information of the node, security compliance information, or a series of pieces of information received from an authentication server). For example, the gateway 203 may insert and transmit information associated with a service request capable of being identified and processed by the service server into a portion suitable for a protocol of the service (e.g., a header and body area for the HTTP) to the service server depending on a series of pieces of information for identifying whether there is the authorized target, which is previously identified by the controller depending on it, or information for determining whether to insert the series of pieces of information previously identified by the controller into a header or a body as a method for inserting the series of pieces of information previously identified by the controller. The gateway 203 may serve to return a response value of the service server for the service request to the node.

According to an embodiment, when the additional information of the authorized target is included in the received service request result after forwarding the service request information, the gateway 203 may remove unnecessary information, such that the node 201 is unable to receive the information, and may forward the service request result.

In other words, the gateway 203 according to embodiments disclosed in the present disclosure may be configured to control the node 201 not to transmit or receive the additional information of the authorized target such that the gateway 203 or the service server blocks a service request of an unauthorized target.

Figure 6:
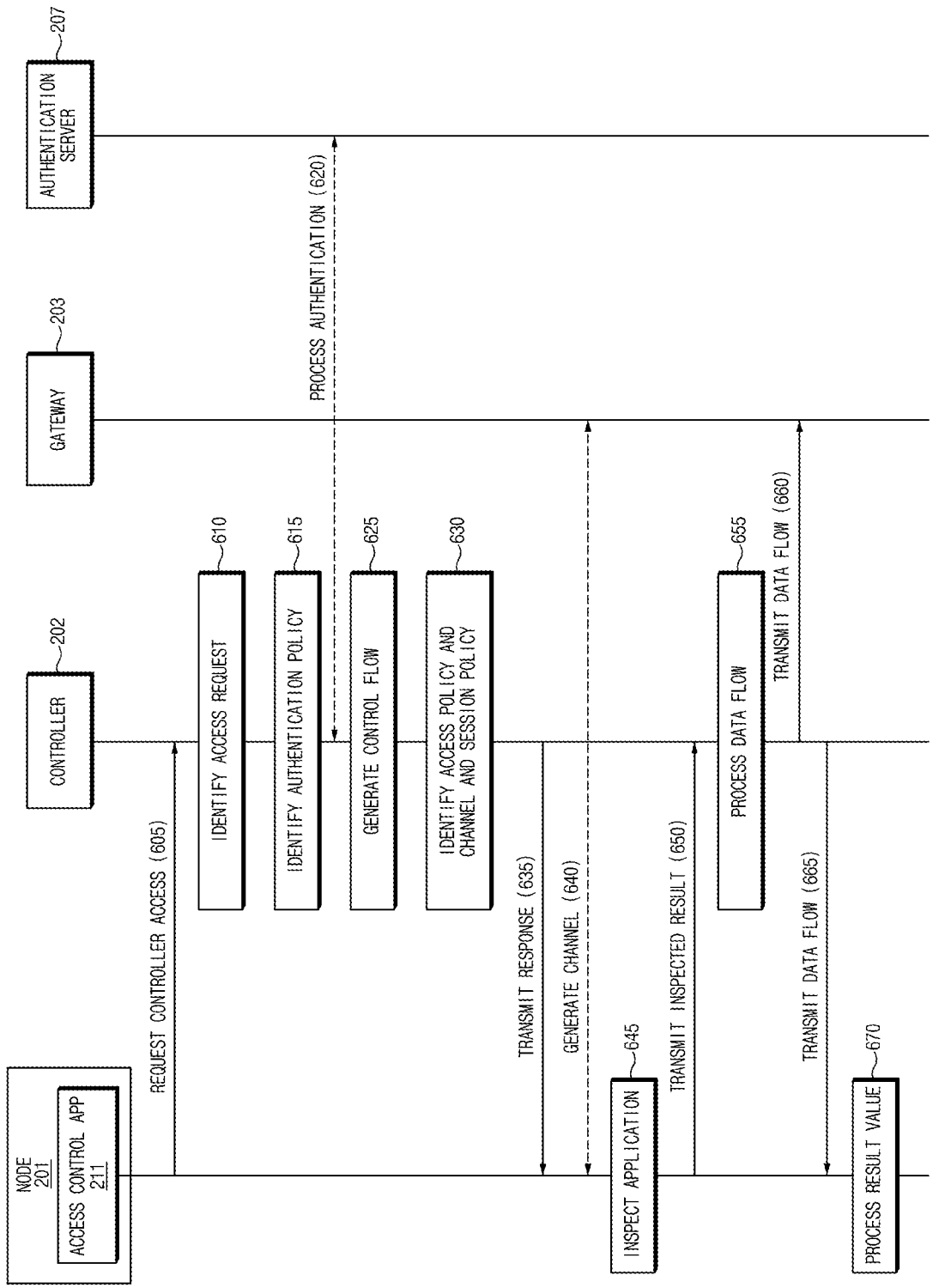
FIG. 6 illustrates a signal sequence diagram for controller access according to various embodiments.

FIG. 6 illustrates a signal sequence diagram for controller access according to various embodiments.

Because a node 201 is required to be authorized by a controller 202 to access or receive a network, an access control app 211 of the node 201 may request the controller 202 to generate control flow, thus attempting controller access of the node 201. According to an embodiment, the node 201 may be substantially the same as a node 201 of FIG. 1 in which the access control app 211 is installed.

Referring to FIG. 6, the node 201 may detect a controller access event. For example, when the access control app 211 is installed and run in the node 201, the node 201 may detect that access to the controller 202 is requested.

In operation 605, the node 201 may request controller access from the controller 202. For example, the access control app 211 may transmit identification information of the access control app 211 to the controller 202.

In operation 610, the controller 202 may identify whether it is accessible to a target (e.g., the access control app 211 or the node 201) which requests controller access. According to an embodiment, the controller 202 may identify whether it is accessible to the target which requests the controller access based on at least one of whether information received from the node 201 is included in an access policy database 311 or whether identification information of the node 201, identification information of a network to which the node 201 belongs, and/or identification information of the access control app 211 are/is included in a blacklist database 314.

When it is accessible to the target, in operation 615, the controller 202 may identify whether the identified node 201 performs additional authentication by means of an authentication server 207 (e.g., an authentication-related technology such as OAuth, SAML, LDAP, or Active Directory) except for the controller 202 based on an authentication policy database 319. According to an embodiment, when there is no need to perform the additional authentication, the controller 202 may perform operation 625. According to an embodiment, when there is a need to perform the additional authentication, in operation 620, the controller 202 may request authentication from the authentication server 207 based on the identified information and information set in the authentication policy database 319 and may receive an authenticated result. According to an embodiment, when receiving an authentication impossibility result from the authentication server 207, in operation 635, the controller 202 may transmit inaccessible information to the node 201.

When receiving authentication complete information from the authentication server 207, the controller 202 may store authentication-related information received from the authentication server 207 (e.g., a series of pieces of information for identifying authentication-related information of the node, for example, an authentication token or the like for a service to identify authentication information of the node by means of the authentication server 207 and receive related privilege information or receive additional information).

When the authentication is completed or the additional authentication is not required, in operation 625, the controller 202 may generate control flow between the node 201 (or the access control app 211) and the controller 202. In this case, the controller 202 may generate control flow identification information in the form of a random number and may store identification information of at least one of the node 201, the network to which the node 201 belongs, or the access control app 211 in a control flow table 315. The information stored in the control flow table 315 may be used for policy identification and/or validation for user authentication of the node 201, an information update of the node 201, or network access of the node 201.

In operation 630, the controller 202 may generate whitelist information of an application accessible based on an access policy database 311 and a channel and session policy database 312 corresponding to the identified information (e.g., information of the node 201 or information of a source network to which the node 201 belongs). According to an embodiment, the controller 202 may identify whether there is information of a destination network 205 with which the node 201 which currently requests access is basically connected, based on the identified information, the access policy database 311, and the channel and session policy database 312. In an embodiment, in operation 635, the controller 202 may transmit the application whitelist to the access control app 211.

When it is accessible to the target, the controller 202 may list channel types and gateways with which the node 201 is able to be connected. For example, the controller 202 may list channel types and gateways with which the node 201 is able to be connected, based on a combination of at least one or two or more of a type of the node 201 included in control flow, position information of the node 201, an environment of the node 201, and information of a network including the node 201, identification information (e.g., IP information) of the node 201, which is identified by means of the controller 202, or identification information of the node 201, which is identified by the node 201.

The controller 202 may identify states of the listed gateways (e.g., throughput or whether there is a fault) and may identify a channel and the gateway 203 optimized for the node 201 among the listed gateways. For example, the controller 202 may identify one channel and one gateway 203. According to an embodiment, when there are the channel and the gateway 203, which are able to access the node 201, in operation 635, the controller 202 may transmit channel generation information, such as gateway 203 and channel authentication information, for the node 201 to generate a channel to the node 201. According to an embodiment, the channel may include any one of a tunnel or a session.

According to an embodiment, for a structure in which the gateway 203 which is present in the network to which the node 201 belongs is accessed through a previously connected channel which is present at a destination network boundary, rather than a structure in which a channel is generated between the node 201 and the gateway 203, or when accessing between the node 201 and the destination network boundary through another channel technology, the controller 202 may fail to transmit the channel generation information to the node 201.

In operation 635, the controller 202 may transmit control flow identification information to the node 201 in response to the controller access request. According to an embodiment, when it is inaccessible to the target which requests the controller access or the target is included in a blacklist, the controller 202 may fail to generate control flow and may transmit inaccessible information in operation 635. In an embodiment, the controller 202 may transmit the application whitelist generated by performing operation 630 to the access control app 211.

When there is a need to generate a channel (e.g., when the channel generation information is received from the controller 202), in operation 640, the access control app 211 may request the gateway 203 to generate a channel based on information for generating the channel, which is received from the controller 202, (e.g., a series of pieces of information necessary to generate the channel, for example, gateway 203 and channel authentication information). The gateway 203 may generate the channel in response to the channel generation request of the node 201. According to an embodiment, when it is determined that there is no need to generate the channel by the controller 202 (e.g., when the channel generation information is not received from the controller 202, when channel generation unnecessity information is received from the controller 202, or the like), the access control app 211 may fail to perform operation 640 and may perform operation 645.

When the channel is generated in operation 640, in operation 650, the access control app 211 may identify whether there are channel generation complete information and a dedicated IP set according to the channel generation and may transmit the channel generation complete information and the dedicated IP information to the controller 202.

In operation 645, the access control app 211 may inspect the application. For example, the access control app 211 may inspect the application based on an accessible application whitelist received from the controller 202. According to an embodiment, the access control app 211 may identify whether the application is present (or installed) in the node 201 based on accessible application information.

In operation 650, the access control app 211 may transmit the inspected result to the controller 202. For example, the access control app 211 may transmit the channel generation complete information and assigned channel identification information (or IP information) to the controller 202. For another example, the access control app 211 may transmit the result of identifying whether the application is installed based on the application whitelist to the controller 202.

In operation 655, the controller 202 may process data flow. For example, when the channel generation complete information is received, the controller 202 may register channel-specific IP information assigned to the node 201 and the channel generation complete information in a channel and session table (e.g., a channel and session table 318 of FIG. 3) and may update information transmitted by the node 201 in control flow corresponding to the node 201.

The controller 202 may identify the gateway 203 in which the node 201 is located from an access policy database (e.g., an access policy database 311 of FIG. 3) for granting access of the node 201 connected with the network and a service policy database 317. Furthermore, the controller 202 may generate data flow including a destination IP, service port information, and service domain information, such that the node 201 controls a service processing request without performing a network access request procedure. According to an embodiment, the data flow may include accessibility control information for identifying that the gateway 203 is the authorized node 201 (e.g., whether there is access based on logical connection authentication, whether there is access based on an authorized channel or session, information for identifying it, or state information), information associated with whether to perform additional authentication such that the node 201 accesses the service, or additional information of an authorized target, which will be inserted by means of the gateway 203, as information preset by a service provider (e.g., information incapable of being identified through a general service protocol, for example, an operating system of the node, a device type of the node, user identification information of the node, security compliance information, or a series of pieces of information received from the authentication server). For example, the additional information of the authorized target may include a series of pieces of information for identifying whether there is the authorized target, which is previously identified by the controller depending on it, or information for determining whether to insert the series of pieces of information previously identified by the controller into a header or a body as a method for inserting the series of pieces of information previously identified by the controller. In this case, in operations 660 and 665, the controller 202 may transmit the generated data flow to the gateway 203 and the access control app 211 of the node 201.

In operation 670, the access control app 211 may process a result value according to the received response. For example, the access control app 211 may store the received control flow identification information and may display a user interface screen indicating that the controller access is completed to a user. When the controller access is completed, the network access request of the node 201 for a destination network may be controlled by the controller 202.

According to another embodiment, the controller 202 may determine that it is inaccessible to the node 201. For example, when the identification information of the node 201 and/or identification information of the network to which the node 201 belongs are/is included in a blacklist database, the controller 202 may determine that it is inaccessible to the node 201. In this case, the controller 202 may fail to generate control flow in operation 625 and may transmit a response indicating that the controller access is impossible in operation 635. Furthermore, in this case, operations 640 to 665 may fail to be performed. According to an embodiment, when there is a need to reattempt controller access, the access control app 211 may perform operation 605 again.

Furthermore, when there is the data flow received from the controller 202, the access control app 211 may update the data flow of the node 201 and may manage the data flow to transmit a data packet based on the data flow previously authorized upon network access. Thereafter, when the data packet transmission request is detected, the access control app 211 may process the data packet to be transmitted based on the received data flow.

According to an embodiment, when receiving the network access release information from the controller 202, the access control app 211 may end the application or may block all network access of the application.

Figure 7:
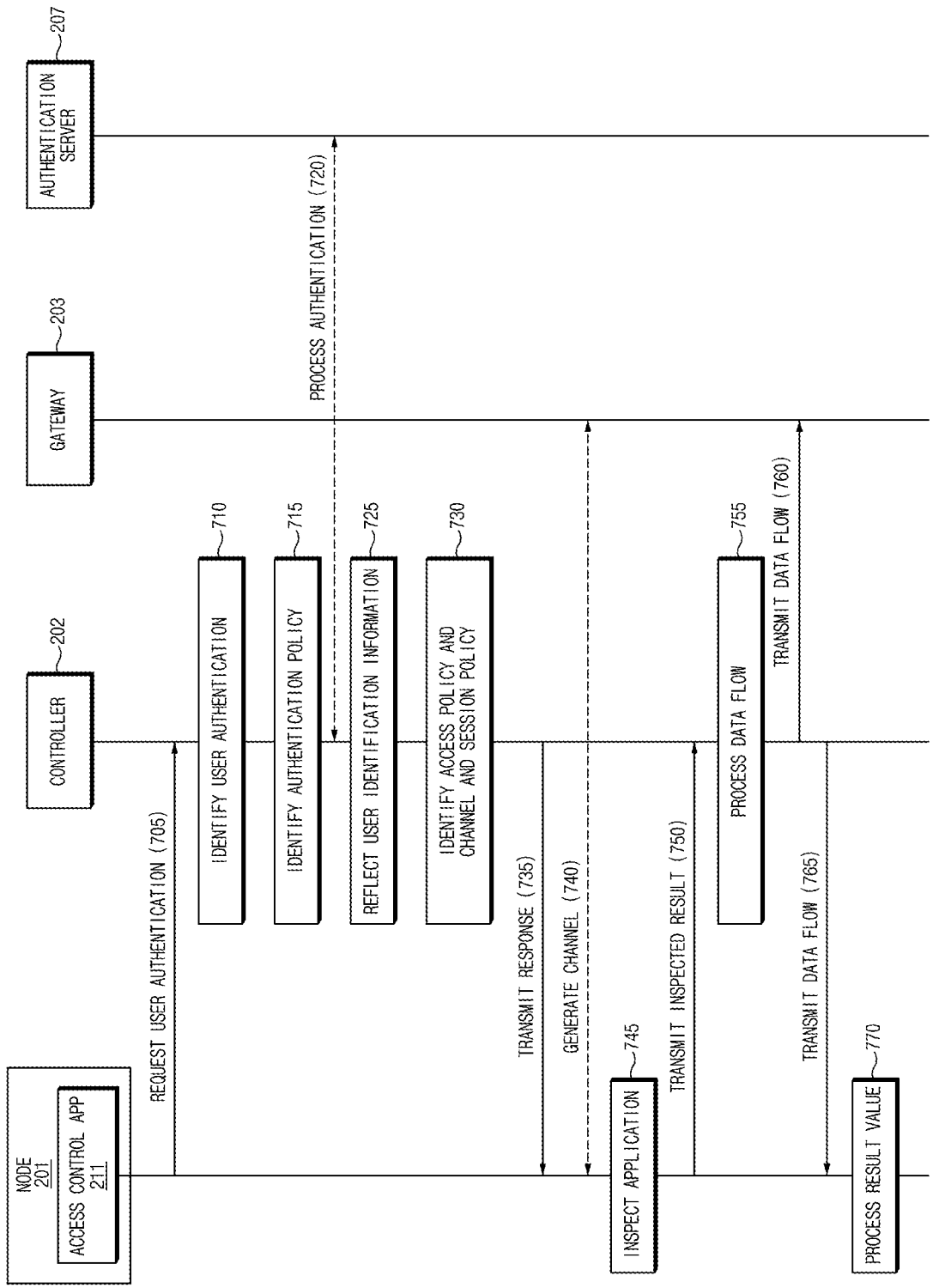
FIG. 7 illustrates a signal sequence diagram for user authentication according to various embodiments.

FIG. 7 illustrates a signal sequence diagram for user authentication according to various embodiments.

For a node 201 to be assigned the detailed privilege of access to a destination network, an access control app 211 of the node 201 may be authenticated for a user of the node 201 from a controller 202. According to an embodiment, the node 201 may be substantially the same as a node 201 of FIG. 1 in which the access control app 211 is installed.

Referring to FIG. 7, the node 201 may receive an input for user authentication. The input for user authentication may be, for example, a user input for inputting a user ID and a password. For another example, the input for user authentication may be a user input (e.g., biometric information) for more reinforced authentication. In this case, in operation 705, the access control app 211 of the node 201 may request user authentication from the controller 202. When control flow between the node 201 and the controller 202 is already generated, the access control app 211 may transmit the input information for user authentication together with control flow identification information.

In operation 710, the controller 202 may authenticate a user based on the information received from the node 201. For example, the controller 202 may determine whether it is accessible to the user depending on an access policy and whether the user is included in a blacklist based on a user ID, a password, and/or reinforced authentication information, which are included in the received information, and a database (e.g., an access policy database 311 or a blacklist database 314 of FIG. 3) included in a memory of the controller 202.

When the user is authenticated, in operation 715, the controller 202 may identify whether the identified node 201 performs additional authentication by means of an authentication server 207 (e.g., an authentication-related technology such as OAuth, SAML, LDAP, or Active Directory) except for the controller 202 based on the authentication policy database 319. According to an embodiment, when there is no need to perform the additional authentication, the controller 202 may perform operation 725. According to an embodiment, when there is a need to perform the additional authentication, in operation 720, the controller 202 may request authentication from the authentication server 207 based on the identified information and information set in the authentication policy database 319 and may receive an authenticated result. According to an embodiment, when receiving an authentication impossibility result from the authentication server 207, in operation 735, the controller 202 may transmit inaccessible information to the node 201.

When receiving authentication complete information from the authentication server 207, the controller 202 may store authentication-related information received from the authentication server 207 (e.g., a series of pieces of information for identifying authentication-related information of the node, for example, an authentication token or the like for a service to identify authentication information of the node by means of the authentication server 207 and receive related privilege information or receive additional information).

When the authentication is completed or the additional authentication is not required, in operation 725, the controller 202 may add identification information (e.g., a user ID) of the user to identification information of control flow. The added user identification information may be used for controller access or network access of the authenticated user.

In operation 730, the controller 202 may generate whitelist information of an application accessible from the access policy database 311 and a channel and session policy database 312 corresponding to the identified information (e.g., information of the node 201 or information of a source network to which the node 201 belongs). According to an embodiment, the controller 202 may identify whether information of a destination network with which the node 201 which currently requests access is basically connected, based on the identified information, the access policy database 311, and the channel and session policy database 312. In an embodiment, in operation 735, the controller 202 may transmit the application whitelist to the access control app 211.

When it is accessible to the target, the controller 202 may list channel types and gateways with which the node 201 is able to be connected. For example, for the node 201 to access the destination network, the controller 202 may list channel types and gateways with which the node 201 is able to be connected, based on a combination of at least one or two or more of a type of the node 201 included in control flow, position information of the node 201, an environment of the node 201, and information of a network including the node 201, identification information (e.g., IP information) of the node 201, which is identified by means of the controller 202, or identification information of the node 201, which is identified by the node 201.

The controller 202 may identify states of the listed gateways (e.g., throughput or whether there is a fault) and may identify a channel and the gateway 203 optimized for the node 201 among the listed gateways. For example, the controller 202 may identify one channel and one gateway 203. According to an embodiment, when there are the channel and the gateway 203, which are able to access the node 201, in operation 735, the controller 202 may transmit channel generation information, such as gateway 203 and channel authentication information, for the node 201 to generate a channel to the node 201. According to an embodiment, the channel may include any one of a tunnel or a session.

According to an embodiment, for a structure in which the gateway 203 which is present in the network to which the node 201 belongs is accessed through a previously connected channel which is present at a destination network boundary, rather than a structure in which a channel is generated between the node 201 and the gateway 203, or when accessing between the node 201 and the destination network boundary through another channel technology, the controller 202 may fail to transmit the channel generation information to the node 201.

In operation 735, the controller 202 may transmit information indicating that the user is authenticated to the node 201 in response to the user authentication request. In an embodiment, the controller 202 may transmit the application whitelist generated by performing operation 730 to the access control app 211.

When there is a need to generate a channel (e.g., when the channel generation information is received from the controller 202), in operation 740, the access control app 211 may request the gateway 203 to generate the channel based on information for generating the channel, which is received from the controller 202, (e.g., a series of pieces of information necessary to generate the channel, for example gateway 203 and channel authentication information). The gateway 203 may generate the channel in response to the channel generation request of the node 201. According to an embodiment, when it is determined that there is no need to generate the channel by the controller 202 (e.g., when the channel generation information is not received from the controller 202, when channel generation unnecessity information is received from the controller 202, or the like), the access control app 211 may fail to perform operation 740 and may perform operation 745.

When the channel is generated in operation 740, the access control app 211 may identify whether there are channel generation complete information and a dedicated IP set according to the channel generation. In operation 750, the access control app 211 may transmit the channel generation complete information and the dedicated IP information to the controller 202.

In operation 745, the access control app 211 may inspect the application. For example, the access control app 211 may inspect the application based on an accessible application whitelist received from the controller 202. The access control app 211 may identify whether an application is present (or installed) in the node 201 based on accessible application information.

In operation 750, the access control app 211 may transmit the inspected result to the controller 202. For example, the access control app 211 may transmit the channel generation complete information and assigned channel identification information (or IP information) to the controller 202. For another example, the access control app 211 may transmit the result of identifying whether the application is installed based on the application whitelist to the controller 202.

In operation 755, the controller 202 may process data flow. For example, when the channel generation complete information is received, the controller 202 may register channel-specific IP information assigned to the node 201 and the channel generation complete information in a channel and session table (e.g., a channel and session table 318 of FIG. 3) and may update information transmitted by the node 201 in control flow corresponding to the node 201.

The controller 202 may identify the gateway 203 at which the node 201 is located from an access policy database (e.g., the access policy database 311 of FIG. 3) for granting access of the node 201 connected with the network and a service policy database 317. Furthermore, the controller 202 may generate data flow including a destination IP, service port information, and service domain information, such that the node 201 controls a service processing request without performing a network access request procedure. According to an embodiment, the data flow may include accessibility control information for identifying that the gateway 203 is the authorized node 201 (e.g., whether there is access based on logical connection authentication, whether there is access based on an authorized channel or session, information for identifying it, or state information), information associated with whether to perform additional authentication such that the node 201 accesses the service, or additional information of an authorized target, which will be inserted by means of the gateway 203, as information preset by a service provider (e.g., information incapable of being identified through a general service protocol, for example, an operating system of the node, a device type of the node, user identification information of the node, security compliance information, or a series of pieces of information received from the authentication server). For example, the additional information of the authorized target may include a series of pieces of information for identifying whether there is the authorized target, which is previously identified by the controller depending on it, or information for determining whether to insert the series of pieces of information previously identified by the controller into a header or a body as a method for inserting the series of pieces of information previously identified by the controller. In this case, in operations 760 and 765, the controller 202 may transmit the generated data flow to the gateway 203 and the access control app 211 of the node 201.

In operation 770, the access control app 211 may process a result value according to the received response. For example, the access control app 211 may store the received control flow identification information and may display a user interface screen indicating that the user authentication is completed to a user. When the user authentication is completed, the network access request of the node 201 for a destination network may be controlled by the controller 202.

According to another embodiment, the controller 202 may determine that user authentication of the node 201 is impossible. For example, when the identification information of the node 201 and/or the identification information of the network to which the node 201 belongs are/is included in a blacklist database, the controller 202 may determine that it is inaccessible to the node 201 and the user authentication is impossible. In this case, the controller 202 may fail to inflect user identification information in operation 725 and may transmit a response indicating that the controller access is impossible in operation 735. Furthermore, in this case, operations 740 to 765 may fail to be performed.

Furthermore, when there is the data flow received from the controller 202, the access control app 211 may update the data flow of the node 201 and may manage the data flow to transmit a data packet based on the data flow previously authorized upon network access.

According to an embodiment, when receiving the network access release information from the controller 202, the access control app 211 may end the application or may block all network access of the application.

Figure 8:
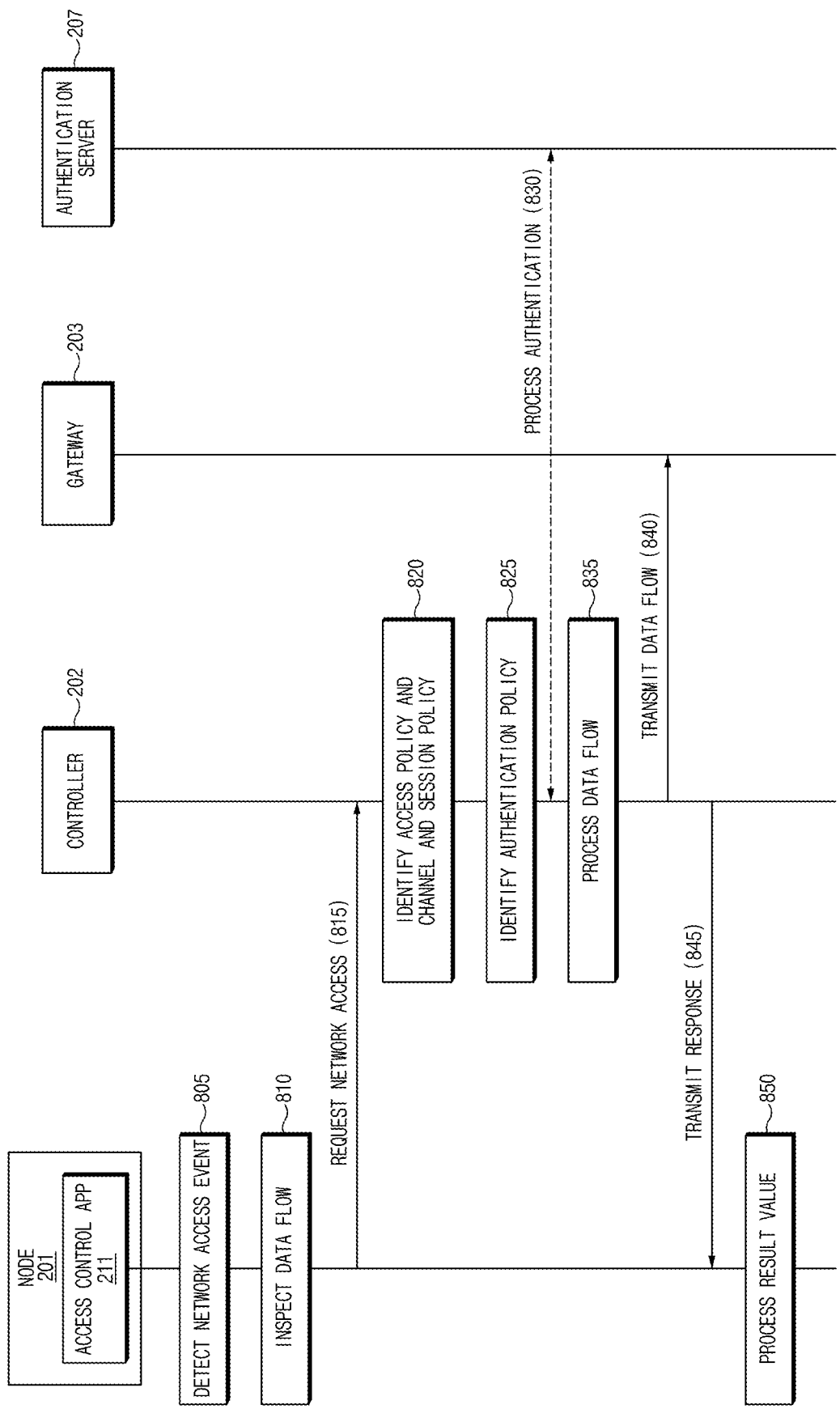
FIG. 8 illustrates a signal sequence diagram for network access according to various embodiments.

FIG. 8 illustrates a signal sequence diagram for network access according to various embodiments.

After a node 201 is authorized from a controller 202, it may control network access of other applications stored in the node 201 by means of an access control app 211 of the node 201, thus ensuring trusted data transmission. According to an embodiment, the node 201 may be substantially the same as a node 201 of FIG. 2 in which the access control app 211 is installed.

Referring to FIG. 8, in operation 805, the access control app 211 may detect a network access event of another application (e.g., a first target app 212 of FIG. 2) stored in the node 201.

In operation 810, the access control app 211 may identify whether there is data flow corresponding to identification information of an application which requests network access, identification information of a destination network, and port information of the destination network. According to an embodiment, when the data flow is present and is not valid, the access control app 211 may drop a data packet. According to another embodiment, when the data flow is present, the access control app 211 may transmit the data packet based on the data flow. According to an embodiment, the access control app 211 of the node 201 may fail to perform operation 810 and may perform a network access request in operation 815.

When the data flow is not present or when the data flow should be updated, for example, when there is a need to update the data flow as an authentication time expires, in operation 815, the access control app 211 may request network access from the controller 202. For example, the network access request may include control flow identification information, the identification information of the target app, identification information of the destination network, and the port information of the destination network.

In operation 820, the controller 202 may identify whether identification information for requesting access (e.g., the identification information of the destination and the port information of the target network) is included and whether the destination network is accessible, in an access policy corresponding to information identified based on the control flow identification information (e.g., node, user, or source network identification information). According to an embodiment, the controller 202 may identify whether the target app is able to access a gateway 203 or a destination network 205. According to an embodiment, when the network access is impossible, in operation 845, the controller 202 may transmit an inaccessible result to the access control app 211 of the node 201.

When the target application is able to access the gateway 203 or the destination network 205, the controller 202 may identify whether there is access based on logical connection authentication or access based on an authorized channel or session as an accessibility control element for the node 201 or the target app authorized based on a channel and session policy database 312 to access the network.

According to an embodiment, when performing accessibility control based on logical connection authentication, the controller 202 may perform a procedure for generating data flow including information for the logical connection authentication.

According to an embodiment, when performing accessibility control based on the channel, the controller 202 may identify whether the channel is generated between the node 201 and the gateway 203. For example, when the channel is not generated, the controller 202 may transmit the inaccessible result to the node 201. For another example, when the channel is generated, the controller 202 may perform a procedure for generating data flow.

According to an embodiment, when performing accessibility control based on the session, the controller 202 may perform a procedure for generating data flow including information for generating the session.

When the target app is able to access the gateway 203 or the destination network 205, in operation 825, the controller 202 may identify whether the identified node 201 performs additional authentication by means of an authentication server 207 (e.g., an authentication-related technology such as OAuth, SAML, LDAP, or Active Directory) except for the controller 202 based on the authentication policy database 319. According to an embodiment, when there is no need to perform the additional authentication, the controller 202 may perform operation 835. According to an embodiment, when there is a need to perform the additional authentication, in operation 830, the controller 202 may request authentication from the authentication server 207 based on the identified information and information set in the authentication policy database 319 and may receive an authenticated result. According to an embodiment, when receiving an authentication impossibility result from the authentication server 207, in operation 845, the controller 202 may transmit inaccessible information to the node 201.

When receiving authentication complete information from the authentication server 207, the controller 202 may store authentication-related information received from the authentication server 207 (e.g., a series of pieces of information for identifying authentication-related information of the node, for example, an authentication token or the like for a service to identify authentication information of the node by means of the authentication server 207 and receive related privilege information or receive additional information).

When the authentication is completed or the additional authentication is not required, in operation 835, the controller 202 may identify whether there is valid data flow corresponding to information requested for access by the node 201 (e.g., destination identification information and port information).

According to an embodiment, when there is the valid data flow, the controller 202 may fail to generate data flow and may perform operations 840 and 845.

According to an embodiment, when there is no the valid data flow, the controller 202 may generate data flow including a source IP, a destination IP, service port information, and service domain information.

According to an embodiment, the data flow may include accessibility control information for identifying that the gateway 203 is the authorized node 201 (e.g., whether there is access based on logical connection authentication, whether there is access based on an authorized channel or session, information for identifying it, or state information), information associated with whether to perform additional authentication such that the node 201 accesses the service, or additional information of an authorized target, which will be inserted by means of the gateway 203, as information preset by a service provider (e.g., information incapable of being identified through a general service protocol, for example, an operating system of the node, a device type of the node, user identification information of the node, security compliance information, or a series of pieces of information received from the authentication server). For example, the additional information of the authorized target may include a series of pieces of information for identifying whether there is the authorized target, which is previously identified by the controller depending on it, or information for determining whether to insert the series of pieces of information previously identified by the controller into a header or a body as a method for inserting the series of pieces of information previously identified by the controller. In this case, in operations 840 and 845, the controller 202 may transmit the generated data flow to the gateway 203 and the access control app 211 of the node 201.

In operation 850, the access control app 211 of the node 201 may process a result value for the response received from the controller 202. For example, when receiving the network access impossibility result from the controller 202, the access control app 211 may drop a data packet to be transmitted by the target app. For another example, when the data flow is received from the controller 202, the access control app 211 may transmit a data packet based on the received data flow. In this case, the access control app 211 may update existing data flow to the received data flow.

Figure 9:
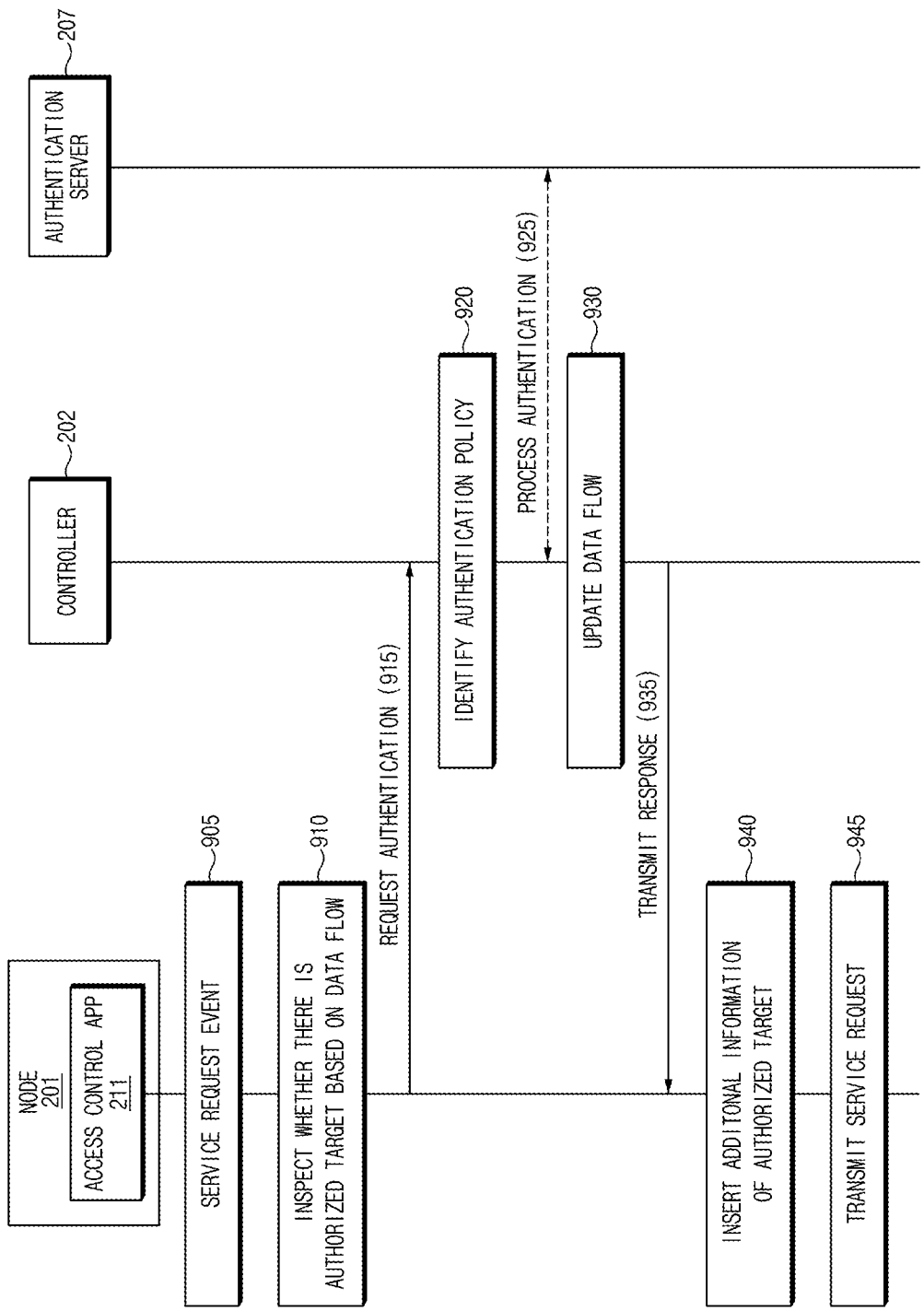
FIG. 9 illustrates a signal sequence diagram for processing a service request according to various embodiments.

FIG. 9 illustrates a signal sequence diagram for processing a service request according to various embodiments.

When the service request is received from an authorized target, the gateway 203 may insert and forward information associated with the authorized target, thus performing network access control such that a service server which is present in a destination network 205 identifies whether the service request is a request received from the authorized target.

In operation 905, a proxy included in the gateway 203 may receive the service request.

In operation 910, the gateway 203 may identify whether there is data flow corresponding to a destination IP and port information included in a received IP header, a destination IP and port information included in the service request, or service domain information, and an accessibility control type and identification information of the service request (e.g., identification by a logical connection, identification by a channel, or identification by a certificate).

According to an embodiment, when the data flow is not present or when the data flow is present, but is not valid (e.g., for access by an unauthorized accessibility control type and identification information or a destination IP and port information or service domain information which are an authorized accessibility control type and identification information, but are inaccessible), the gateway 203 may deny the service request.

According to an embodiment, when there is data flow and authentication is not required, the gateway 203 may fail to perform operations 915 to 935 and may perform operation 940.

According to an embodiment, when there is the data flow, but the authentication is required, in operation 915, the gateway 203 may request authentication from the controller 202 based on the data flow.

In operation 920, the controller 202 may identify whether to perform additional authentication by means of an authentication server 207 (e.g., an authentication-related technology such as OAuth, SAML, LDAP, or Active Directory) based on the received authentication request. According to an embodiment, when there is no need to perform the additional authentication, the controller 202 may perform operation 930. According to an embodiment, when there is a need to perform the additional authentication, in operation 925, the controller 202 may request authentication from the authentication server 207 based on the identified information and information set in an authentication policy database 319 and may receive an authenticated result. According to an embodiment, when receiving an authentication impossibility result from the authentication server 207, in operation 935, the controller 202 may transmit inaccessible information to the gateway 203.

When receiving authentication complete information from the authentication server 207, in operation 930, the controller 202 may update authentication-related information received from the authentication server 207 (e.g., a series of pieces of information for identifying authentication-related information of the node, for example, an authentication token or the like for a service to identify authentication information of the node by means of the authentication server 207 and receive related privilege information or receive additional information) in data flow and may transmit the updated data flow to the gateway 203.

According to an embodiment, when the authentication is not required, the controller 202 may update authentication information of the identified data flow and may transmit the updated data flow to the gateway 203.

In operation 940, the gateway 203 may generate authentication information based on an authentication information generation algorithm and additional information included in the authentication information of the data flow. According to an embodiment, the gateway 203 may encrypt the authentication information using an encryption algorithm and an encryption key included in the authentication information and may insert a data flow header in which the encrypted authentication information and data flow identification information are combined with each other into service request information depending on a protocol specification of the service.

Authentication server the gateway 203 may include additional information of the authorized target, will be inserted by means of the gateway 203, as information preset by a service provider (e.g., information incapable of being identified through a general service protocol, for example, an operating system of the node, a device type of the node, user identification information of the node, security compliance information, or a series of pieces of information received from the authentication server). For example, in operation 945, the gateway 203 may insert a series of pieces of information for identifying whether there is the authorized target, which is previously identified by the controller depending on it, or information for determining whether to insert the series of pieces of information identified by the controller into a header or a body as a method for inserting the series of pieces of information previously identified by the controller depending on a service protocol specification and may transmit the service request.

Figure 10:
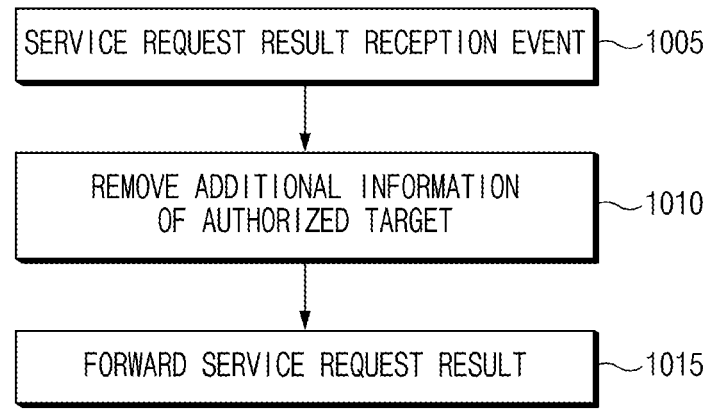
FIG. 10 illustrates an operational flowchart for processing a service request result according to various embodiments.

FIG. 10 illustrates an operational flowchart for processing a service request result according to various embodiments.

When the service request result is received, a gateway 203 may remove additional information, such that the additional information inserted into a service request is not returned to a node 201, and may forward the service request to the node 201, thus securely control network access of the node 201.

In operation 1005, a proxy included in the gateway 203 may receive the service request result.

When there are data flow header information and additional information of an authorized target, which are inserted into the service request result information upon the service request, in operation 1010, the gateway 203 may remove the data flow header information and the additional information of the authorized target.

In operation 1015, the gateway 203 may forward a service request result in which the data flow header information and the additional information of the authorized target are removed.

Figure 11:
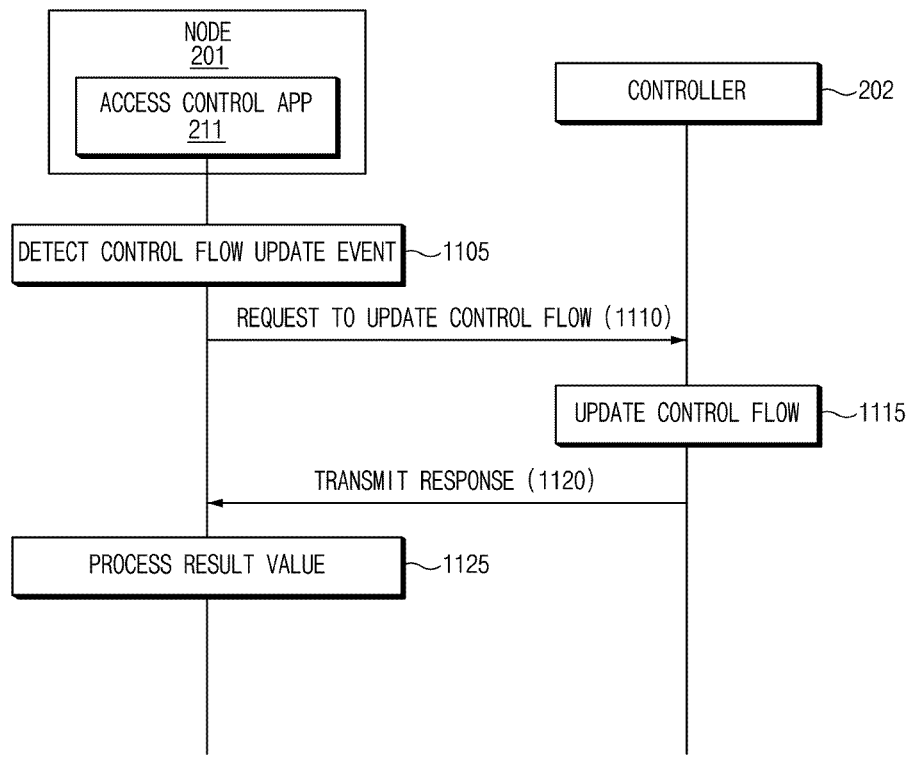
FIG. 11 illustrates a signal sequence diagram for updating control flow according to various embodiments.

FIG. 11 illustrates a signal sequence diagram for updating control flow according to various embodiments.

Referring to FIG. 11, in operation 1105, an access control app 211 may detect a control flow update event.

In operation 1110, the access control app 211 may request a controller 202 to update control flow based on control flow identification information.

In operation 1115, the controller 202 may identify whether there is control flow in a control flow table (e.g., a control flow table 315 of FIG. 3) based on the received control flow identification information. According to an embodiment, when there is no control flow (e.g., when access is released by another security system or when access is released by internal risk detection or the like), because access of the node 201 is not valid, in operation 1120, the controller 202 may transmit an inaccessible result to the access control app 211.

When there is the control flow, the controller 202 may identify data flow corresponding to the control flow.

According to an embodiment, the controller 202 may update an update time included in the control flow and may search for data flow information corresponding to the control flow.

According to an embodiment, when re-authentication should be performed in data flow or when there is data flow which is no longer inaccessible, in operation 1120, the controller 202 may return the data flow information.

In operation 1125, the access control app 211 of the node 201 may process a result value for the response received from the controller 202. For example, when the result of updating the control flow is impossible, the access control app 211 may block all network access of the application. For another example, when the result of updating the data flow is normal and there is the updated data flow information, the access control app 211 may update the data flow.

Figure 12:
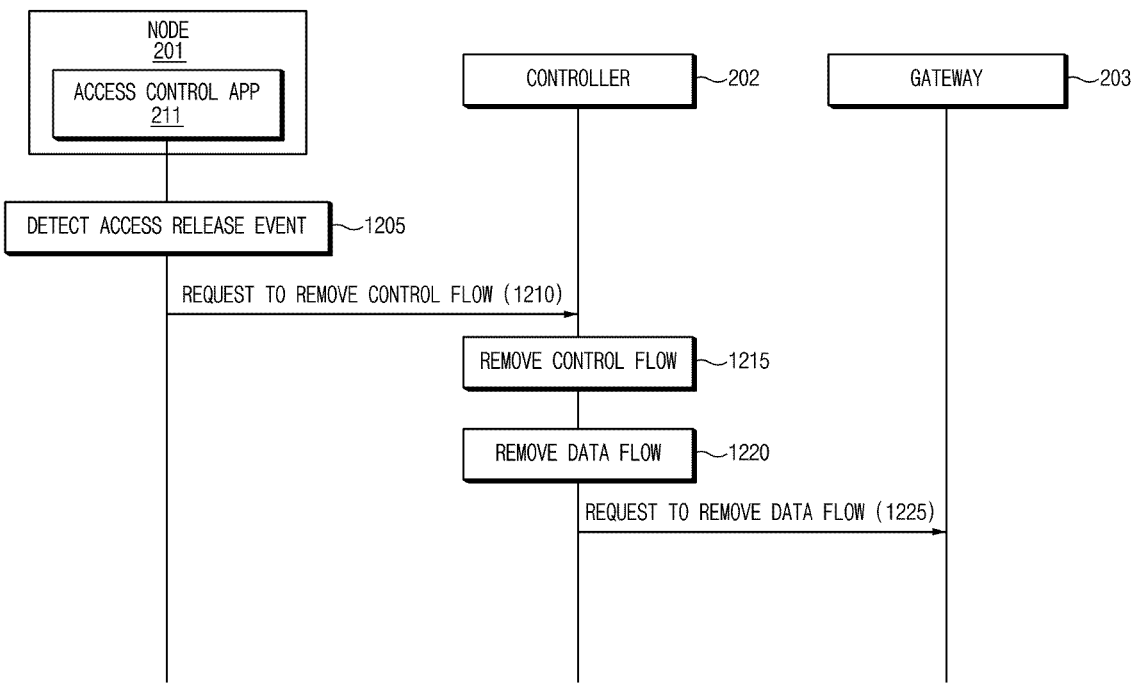
FIG. 12 illustrates a signal sequence diagram for releasing network access according to various embodiments.

FIG. 12 illustrates a signal sequence diagram for releasing access according to various embodiments.

Referring to FIG. 12, in operation 1205, a node 201 may detect at least any one of access end requests based on the end of the node 201, the end of an access control app 211, the end of a target app, that network access is no longer used, and information identified from an interworking system. In this case, in operation 1210, the node 201 or the access control app 211 may request the controller 202 to remove control flow.

In operation 1215, the controller 202 may remove control flow identified based on received control flow identification information.

In operation 1220, the controller 202 may remove all data flow dependent on the removed control flow. Thus, the node 201 may no longer access a destination network based on the removed data flow.

In operation 1225, the controller 202 may request a gateway 203 to remove all the data flow dependent on the removed control flow. Thus, the gateway 203 may remove the data flow. Thus, the data packet corresponding to a source network, a destination network, and port information included in the removed data flow may no longer be transmitted.

Figure 13:
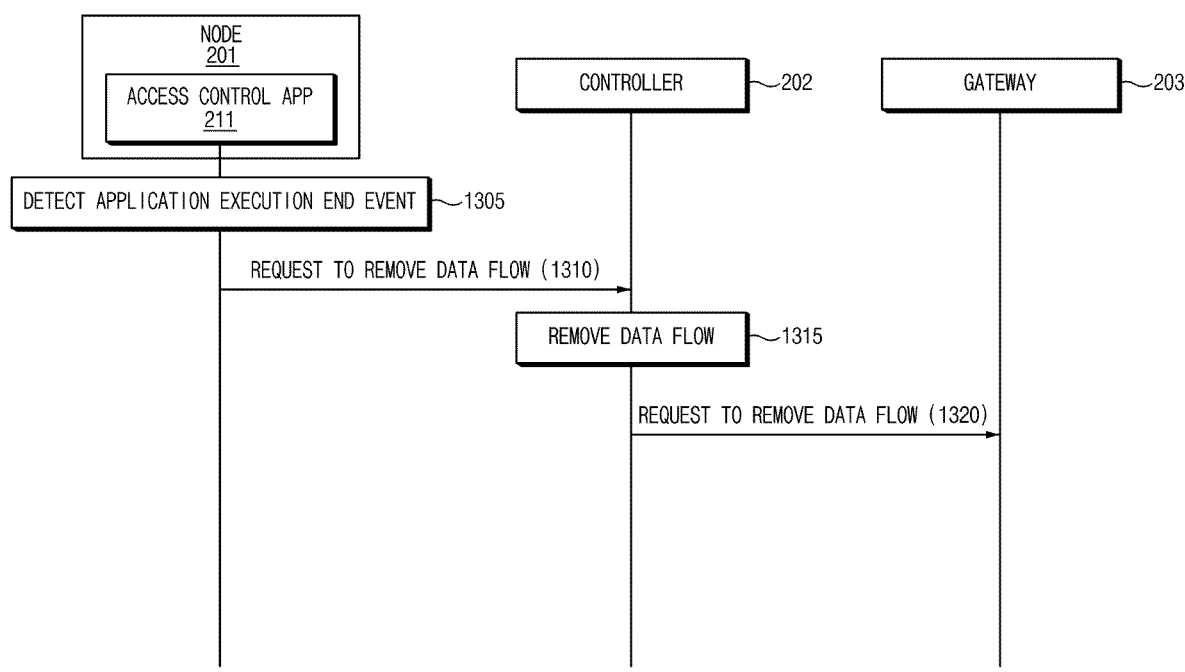
FIG. 13 illustrates a signal sequence diagram for ending application execution according to various embodiments.

FIG. 13 illustrates a signal sequence diagram for ending application execution according to various embodiments.

Referring to FIG. 13, in operation 1305, an access control app 211 of a node 201 may identify whether an application which is running is ended in real time and may detect an application execution end event.

According to an embodiment, the access control app 211 may identify whether there is data flow corresponding to identification information of the ended application and process ID and child process ID tree (PID) information.

In operation 1310, the access control app 211 may request the controller 202 to remove data flow. For example, the access control app 211 may transmit the identification information of the ended application or identification information of data flow corresponding to the ended application to the controller 202 and may request the controller 202 to remove the data flow.

In operation 1315, the controller 202 may delete data flow, the removal of which is requested. Furthermore, in operation 1320, the controller 202 may request the gateway 203 to remove the removed data flow. Thus, the gateway 203 may remove the data flow. Thus, the data packet corresponding to a source network, a destination network, and port information included in the removed data flow may no longer be transmitted.

Figure 14:
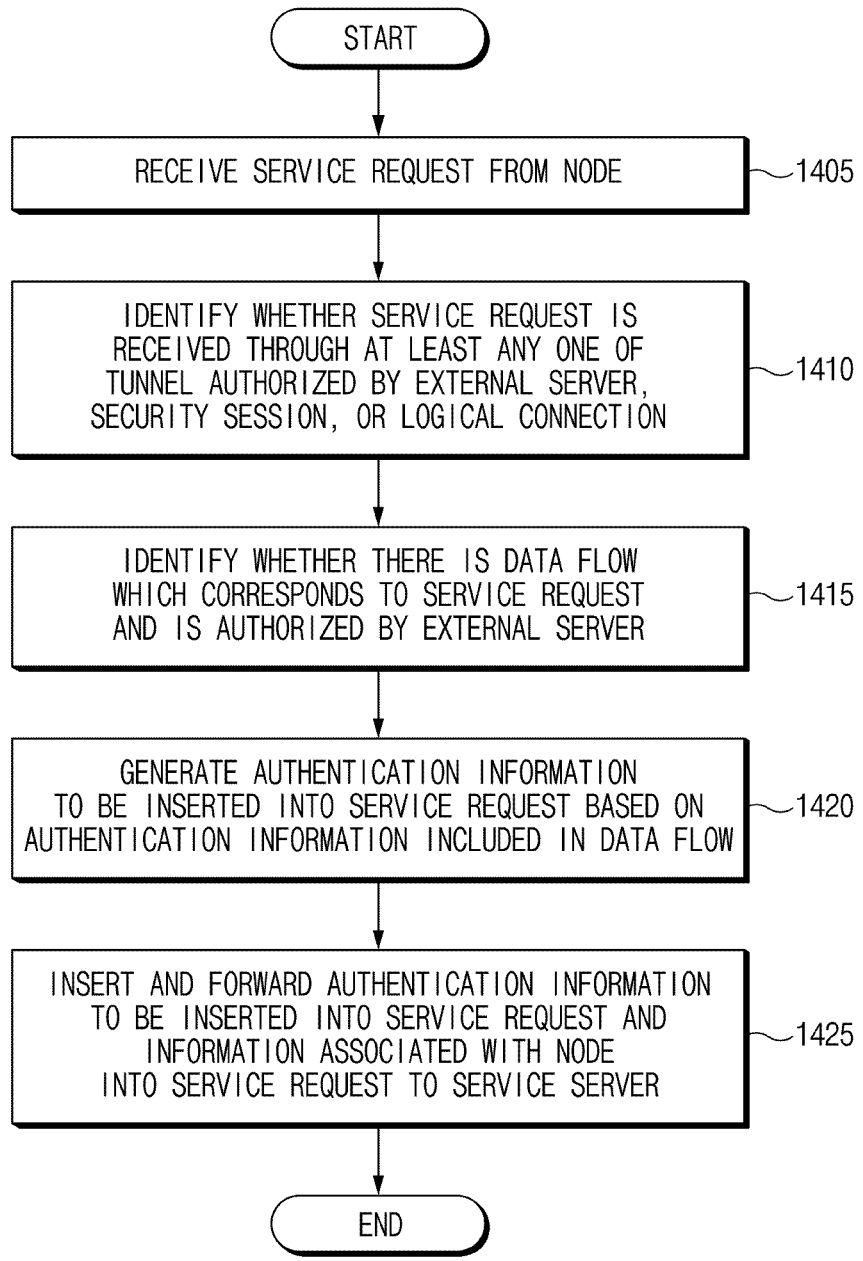
FIG. 14 illustrates a flowchart for describing an operation method of a gateway according to various embodiments.

FIG. 14 illustrates a flowchart for describing an operation method of a gateway according to various embodiments. Operations shown in FIG. 14 may be performed by means of a gate 203 of FIG. 2. In operation 1405, the gateway 203 may receive a service request from a node.

In operation 1410, the gateway 203 may identify whether the service request is received through at least any one of a tunnel authorized by an external server, a security session, or a logical connection.

In operation 1415, the gateway 203 may identify whether there is data flow which corresponds to the service request and is authorized by the external server.

In operation 1420, the gateway 203 may generate authentication information to be inserted into the service request based on authentication information of the data flow.

In operation 1425, the gateway 203 may insert and forward authentication information to be inserted into the service request and information associated with the node into the service request to a service server.

According to embodiments disclosed in the present disclosure, because there is no identification information assigned by the service in service request and return information received or transmitted from the node, network access may be controlled such that session hijacking is impossible because there is no information to steal.

Furthermore, according to embodiments disclosed in the present disclosure, a method may be provided to identify and match node information identified and authenticated through control flow (flow of a control data packet) connected between the node and the controller or between the controller and the gateway and information of a connection connected and assigned with the node and the gateway through the controller and data flow (flow of a data packet between the node and the service), insert and transmit identification and authentication information of the node capable of being recognized by the service or additional information to the service at the gateway, and query the controller about identification information received without a separate node and authentication procedure at the service to identify the node.

According to embodiments disclosed in the present disclosure, when important identification and authentication information and the other information are included in information returned to the node by the service, because the gateway removes the corresponding information and transmits the information to the node and because there is substantial identification and authentication information in only an interval between the gateway and the service, which is present in an interval where the node communicates with the service, and there is no the information in an interval between the node and the gateway, vulnerabilities in network access may be resolved.

Furthermore, according to embodiments disclosed in the present disclosure, pieces of important information not to be delivered to the node may be removed through a connection structure among the node, the controller, and the gateway and pieces of related information may be managed (stored, inserted, and the like) by means of the gateway and the controller or a third-party server, such that a logical disconnection between the node and the gateway and between the gateway and the service server may be possible.

Furthermore, according to embodiments disclosed in the present disclosure, the gateway corresponding to a service request of the node may insert and transmit previously identified information (e.g., user, node, and application identification information), additional information (e.g., a node type, compliance Information, or the like), and information (e.g., an access token or the like) identified or issued after the node performs authentication from a third certification body to the service. The service may remove and transmit the information when the service request is returned and passes through the gateway rather than performing internal authentication and privilege processing based on the inserted information without separate interworking with the controller or performing authentication through interworking with a third certification body. The node may provide a state in which it is unable to obtain and manipulate important information.

In addition, various effects ascertained directly or indirectly through the present disclosure may be provided.

The above description is merely an illustrative explanation of the technical idea disclosed in the present disclosure, but may be variously modified and altered by those skilled in the art to which the present disclosure pertains without departing from the spirit and scope of the present disclosure claimed in the following claims.

Therefore, the embodiments of the present disclosure are provided to explain the spirit and scope of the present disclosure, but not to limit them, so that the spirit and scope of the present disclosure is not limited by the embodiments. The scope of protection of the technical idea disclosed in the present disclosure should be interpreted in accordance with the claims below, and all the technical ideas within the scope equivalent to the claims should be included in the scope of the present disclosure.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A gateway, comprising:
   a communication circuit;
   a memory; and
   a processor operatively connected with the communication circuit and the memory,
   wherein the processor is configured to:
      receive a service request from a node;
      identify whether the service request is received through at least any one of a tunnel authorized by an external server, a security session, or a logical connection;
      identify whether there is data flow corresponding to the service request and authorized by the external server;
      generate authentication information to be inserted into the service request, based on authentication information included in the data flow;
      request authentication from the external server based on the data flow, when there is the data flow;
      receive an authenticated result and the data flow in which the authentication information is updated from the external server;
      generate an updated authentication information to be inserted into the service request based on the data flow in which the authentication information is updated;
      insert the updated authentication information and information associated with the node into the service request; and
      forward the updated authentication information and the information associated with the node to a service server.

2. The gateway of claim 1, wherein the processor is configured to:
   generate the authentication information to be inserted into the service request, based on an authentication information generation algorithm included in the data flow in which the authentication information is updated;
   encrypt the authentication information to be inserted into the service request, based on the data flow in which the authentication information is updated; and
   insert a data flow header in which the encrypted authentication information and identification information of the data flow are combined with each other into the service request.

3. The gateway of claim 1, wherein the information associated with the node includes at least any one of an operating system of the node, a device type of the node, user identification information of the node, security compliance information, or information received from an authentication server.

4. The gateway of claim 1, wherein the information associated with the node includes information for identifying whether the node is an authorized target or information identified in conjunction with the node by the external server.

5. The gateway of claim 1, wherein the processor is configured to:
   insert the information associated with the node into a header and a body of the service request.

6. The gateway of claim 1, wherein the data flow in which the authentication information is updated includes authentication-related information received after the external server queries an authentication server.

7. The gateway of claim 6, wherein the authentication-related information includes an authentication token for a service to identify authentication information about a service request of a target authenticated by means of the authentication server and receive related privilege information or receive additional information.

8. The gateway of claim 1, wherein the processor is configured to:
   receive a service request result from the service server;

remove the authentication information and the information associated with the node, the authentication information and the information being inserted upon the service request, from the service request result; and forward the service request result to the node.

9. A server, comprising:
a communication circuit;
a memory storing a database; and
a processor operatively connected with the communication circuit and the memory,
wherein the processor is configured to:
receive an authentication request including data flow identification information from a gateway;
identify whether to request additional authentication from an authentication server based on the database;
request authentication from the authentication server and receive an authenticated result and authentication-related information, when there is a need to request the additional authentication;
update data flow corresponding to the data flow identification information based on the authentication-related information;
transmit the updated data flow to the gateway;
receive a network access request from a node, the network access request including identification information of a destination network and identification information of a target application of the node;
identify whether the node is able to access the gateway based on the database;
determine whether to perform access based on logical connection authentication, whether to perform access based on an authorized channel or session, or an access scheme of the node for the node to access the destination network based on the database, when the node is able to access the gateway;
identify whether there is a need to request the additional authentication from the authentication server based on the database and perform authentication with the authentication server to receive the authentication-related information;
generate the data flow based on the determined access scheme and the authentication-related information; and
transmit the generated data flow to the node and the gateway.

10. The server of claim 9, wherein the authentication-related information includes an authentication token for a service to identify authentication information about a service request of a target authenticated by means of the authentication server and receive related privilege information or receive additional information.

11. An operation method of a gateway, the operation method comprising:
receiving a service request from a node;
identifying whether the service request is received through at least any one of a tunnel authorized by an external server, a security session, or a logical connection;

identifying whether there is data flow corresponding to the service request and authorized by the external server;
generating authentication information to be inserted into the service request, based on authentication information included in the data flow;
requesting authentication from the external server based on the data flow, when there is the data flow;
receiving an authenticated result and the data flow in which the authentication information is updated from the external server;
generating an updated authentication information to be inserted into the service request based on the data flow in which the authentication information is updated;
inserting the updated authentication information and information associated with the node into the service request; and
forwarding the updated authentication information and the information associated with the node to a service server.

12. The operation method of claim 11, comprising:
generating the authentication information to be inserted into the service request, based on an authentication information generation algorithm included in the data flow in which the authentication information is updated;
encrypting the authentication information to be inserted into the service request, based on the data flow in which the authentication information is updated; and
inserting a data flow header in which the encrypted authentication information and identification information of the data flow are combined with each other into the service request.

13. The operation method of claim 11, wherein the information associated with the node includes at least any one of an operating system of the node, a device type of the node, user identification information of the node, security compliance information, or information received from an authentication server.

14. The operation method of claim 11, wherein the information associated with the node includes information for identifying whether the node is an authorized target or information identified in conjunction with the node by the external server.

15. The operation method of claim 11, comprising:
inserting the information associated with the node into a header and a body of the service request.

16. The operation method of claim 11, wherein the data flow in which the authentication information is updated includes authentication-related information received after the external server queries an authentication server.

17. The operation method of claim 11, comprising:
receiving a service request result from the service server;
removing the authentication information and the information associated with the node, the authentication information and the information being inserted upon the service request, from the service request result; and
forwarding the service request result to the node.

* * * * *